United States Patent
Tsuchiya et al.

(10) Patent No.: US 6,661,623 B1
(45) Date of Patent: Dec. 9, 2003

(54) MAGNETIC TRANSDUCER WITH INTERLAYER THIN-FILM MAGNETIC HEAD AND METHOD OF MANUFACTURING THEREOF

(75) Inventors: Yoshihiro Tsuchiya, Tokyo (JP); Satoru Araki, Tokyo (JP); Masashi Sano, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/425,967

(22) Filed: Oct. 25, 1999

(30) Foreign Application Priority Data

Aug. 11, 1999 (JP) .......................................... 11-227530

(51) Int. Cl.$^7$ ................................................ G11B 5/39
(52) U.S. Cl. ................................................ 360/324.12
(58) Field of Search ................................ 360/315, 313, 360/314, 324, 374.1, 374.11, 374.12, 375, 326, 327; 428/332, 692

(56) References Cited

U.S. PATENT DOCUMENTS

| | | | | |
|---|---|---|---|---|
| 5,027,243 A | * | 6/1991 | Gill et al. ..................... | 360/315 |
| 5,323,285 A | * | 6/1994 | Smith .......................... | 360/315 |
| 5,408,377 A | * | 4/1995 | Gurney et al. ............... | 360/325 |
| 5,485,333 A | * | 1/1996 | Yang et al. .................. | 360/315 |
| 5,751,521 A | * | 5/1998 | Gill ............................. | 360/314 |
| 5,780,176 A | * | 7/1998 | Iwasaki et al. .............. | 428/692 |
| 5,914,839 A | * | 6/1999 | Matsuzono et al. ......... | 360/315 |
| 5,955,211 A | * | 9/1999 | Maeda et al. ................ | 428/692 |
| 6,031,692 A | * | 2/2000 | Kawawake et al. ....... | 360/324.12 |
| 6,046,891 A | * | 4/2000 | Yoda et al. .................. | 360/324 |
| 6,063,491 A | * | 5/2000 | Fujukata et al. ............ | 428/332 |
| 6,124,047 A | * | 9/2000 | Hasegawa .................... | 428/692 |
| 6,134,090 A | * | 10/2000 | Mao et al. ................. | 360/324.1 |
| 6,175,476 B1 | * | 1/2001 | Huai et al. ............. | 360/324.11 |

OTHER PUBLICATIONS

M. Lederman, IEEE Magnetics, Mar. 1999, vol. 35, No. 2, pp.794–799.*
D. M. Considine, Van Nostrand's Scientific Encyclopedia, 1976, 5$^{th}$ edition, p.599.*
M. Lederman, IEEE Transaction of Magnetics, 1999, IEEE, v. 35, pp.794–799.*
Y. Kamiguchi et al., 1999 Digest of INTERMAG99.

* cited by examiner

Primary Examiner—Tianjie Chen
(74) Attorney, Agent, or Firm—Oliff & Berridge, PLC

(57) ABSTRACT

Provided are a magnetic transducer capable of increasing a resistance change and obtaining an appropriate coercive force, a thin film magnetic head, a method of manufacturing a magnetic transducer and a method of manufacturing a thin film magnetic head. A stack, a spin valve film has a stacked structure comprising a first soft magnetic layer, a second soft magnetic layer, a nonmagnetic metal layer, a ferromagnetic layer, an antiferromagnetic layer and a protective layer which are stacked in sequence on an underlying layer. Electrical resistance is changed in accordance with a relative angle between the orientation of magnetization of the ferromagnetic layer and the orientation of magnetization of the first and second soft magnetic layers. A soft magnetic interlayer having magnetism and the electrical resistance higher than the electrical resistance of the first soft magnetic layer is formed in the first soft magnetic layer. When a current flows through the stack, electrons are reflected by the surface of the soft magnetic interlayer and thus a path for the electrons is narrowed. Therefore, a rate of resistance change is increased.

24 Claims, 17 Drawing Sheets

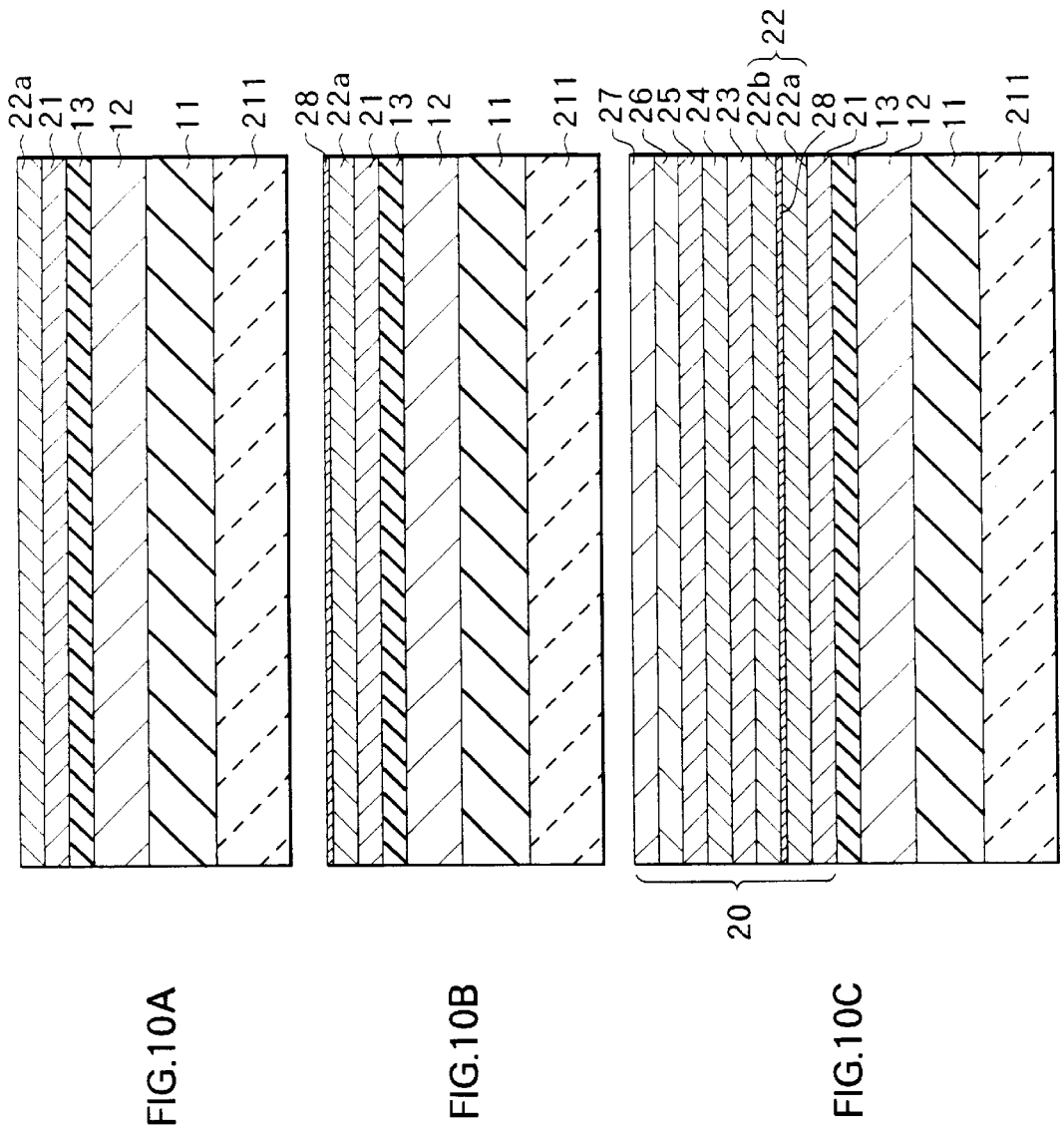

MAGNETIC TRANSDUCER WITH INTERLAYER THIN-FILM MAGNETIC HEAD AND METHOD OF MANUFACTURING THEREOF

BACKGROUND OF THE INVENTION

1. Field of the Invention

The invention relates to a magnetic transducer, a thin film magnetic head using the same, a method of manufacturing a magnetic transducer and a method of manufacturing a thin film magnetic head. More particularly, the invention relates to a magnetic transducer capable of obtaining the more excellent rate of resistance change, a thin film magnetic head and a method of manufacturing the same.

2. Description of the Related Art

Recently, an improvement in performance of a thin film magnetic head has been sought in accordance with an increase in a surface recording density of a hard disk or the like. A composite thin film magnetic head, which has a stacked structure comprising a reproducing head having a magnetoresistive effect (hereinafter referred to as an MR element) that is one of magnetic transducers and a recording head having an inductive-type magnetic transducer, is widely used as the thin film magnetic head.

MR elements include an AMR element using a magnetic film (an AMR film) exhibiting an anisotropic magnetoresistive effect (an AMR effect), a GMR element using a magnetic film (a GMR film) exhibiting a giant magnetoresistive effect (a GMR effect), and so on.

The reproducing head using the AMR element is called an AMR head, and the reproducing head using the GMR element is called a GMR head. The AMR head is used as the reproducing head whose surface recording density exceeds 1 gigabit per square inch, and the GMR head is used as the reproducing head whose surface recording density exceeds 3 gigabits per square inch.

As the GMR film, a "multilayered type (antiferromagnetic type)" film, an "inductive ferromagnetic type" film, a "granular type" film, a "spin valve type" film and the like are proposed. Of these types of films, the spin valve type GMR film is considered to have a relatively simple structure, to exhibit a great change in resistance even under a low magnetic field and to be suitable for mass production.

FIG. 19 shows the structure of a general spin valve type GMR film (hereinafter referred to as a spin valve film). A surface indicated by reference symbol S in the drawing corresponds to the surface facing a magnetic recording medium. This spin valve film has the stacked structure comprising an underlying layer 91, a soft magnetic layer 92 made of a soft magnetic material, a nonmagnetic layer 94 made of a nonmagnetic material, a ferromagnetic layer 95 made of a ferromagnetic material, an antiferromagnetic layer 96 made of an antiferromagnetic material and a protective layer 97, the layers 92, 94, 95, 96 and 97 being stacked in this order on the underlying layer 91. Exchange coupling occurs on an interface between the ferromagnetic layer 95 and the antiferromagnetic layer 96, and thus the orientation of magnetization Mp of the ferromagnetic layer 95 is fixed in a fixed direction. On the other hand, the orientation of magnetization Mf of the soft magnetic layer 92 is freely changed in accordance with an external magnetic field.

A direct current is fed through the ferromagnetic layer 95, the nonmagnetic layer 94 and the soft magnetic layer 92 in the direction of a biasing magnetic field Hb, for example. However, this current is subjected to the resistance in accordance with a relative angle between the orientation of the magnetization Mf of the soft magnetic layer 92 and the orientation of the magnetization Mp of the ferromagnetic layer 95. Receiving a signal magnetic field causes the change in the orientation of the magnetization Mf of the soft magnetic layer 92 and thus the change in electrical resistance of the spin valve film. This change in the resistance is detected as the change in a voltage. Recently, it has been desired that this rate of resistance change (sometimes referred to as a rate of MR change) be made higher in order to allow magnetic recording at ultra-high density exceeding 20 gigabits per square inch.

A cited reference "CoFe specular spin valves with a nano oxide layer", 1999 Digests of INTERMAG 99, published by May 18, 1999 reports that the rate of resistance change has been improved by providing an oxide layer called an NOL layer for the ferromagnetic layer of the spin valve film.

However, there is no description about the material and film thickness of the oxide layer called the NOL layer in the above-mentioned cited reference. Moreover, it is not clear where the NOL layer is formed in the ferromagnetic layer. Furthermore, a relationship between the rate of resistance change and any properties other than the rate of resistance change is not obvious.

More particularly, the above-described known cited reference has a problem that precision of repeatability is deteriorated because a coercive force of the soft magnetic layer is 14 (Oe: oersted), which is greater than 3 (Oe) that is an acceptable limit of the coercive force of a general spin valve film.

SUMMARY OF THE INVENTION

The invention is designed to overcome the foregoing problems. It is an object of the invention to provide a magnetic transducer which can increase a rate of resistance change and can obtain good values of other properties, a thin film magnetic head, a method of manufacturing a magnetic transducer and a method of manufacturing a thin film magnetic head.

A magnetic transducer of the invention including a nonmagnetic layer having a pair of facing surfaces, a soft magnetic layer formed on one surface of the nonmagnetic layer, a ferromagnetic layer formed on the other surface of the nonmagnetic layer and an antiferromagnetic layer formed on the ferromagnetic layer on the side opposite to the nonmagnetic layer comprises a soft magnetic interlayer formed in the soft magnetic layer and having magnetism and electrical resistance higher than the electrical resistance of the soft magnetic layer.

In a magnetic transducer of the invention, the soft magnetic interlayer having the resistance higher than that of the soft magnetic layer exists in the soft magnetic layer. Thus, when a sense current flows through the magnetic transducer, the soft magnetic interlayer reflects electrons and thus limits a route for the electrons. As a result, the rate of resistance change is increased, and therefore even a low signal magnetic field can be detected. Moreover, the soft magnetic interlayer has the magnetism. Thus, the respective magnetizations of two portions in the soft magnetic layer facing each other across the soft magnetic interlayer are integrally changed together in accordance with an external magnetic field such as the signal magnetic field. Thus, a coercive force of the soft magnetic layer can be reduced, and therefore a small variation in output and a high precision of repeatability can be obtained. Moreover, thermal stability is high. This causes less deterioration in properties even if a manufacturing process includes a process of heat treatment. The above advantages permit magnetic recording at high density exceeding 20 gigabits per square inch, for example.

A magnetic transducer of the invention can further adopt the following modes in addition to the above-described constitution.

That is, it is desirable that $0.3T_n \leq D_1 < T_n$, where $T_n$ represents a thickness of the soft magnetic layer and $D_1$ represents a distance between the nonmagnetic layer and the soft magnetic interlayer. Moreover, the distance $D_1$ between the nonmagnetic layer and the soft magnetic interlayer may be 1 nm or more and less than 8 nm. Thus, a range of movement of the electrons is not excessively narrowed but can be effectively limited. Consequently, the higher rate of resistance change can be obtained.

Furthermore, it is desirable that the soft magnetic layer has a first soft magnetic layer containing at least Ni in a group consisting of Ni (nickel), Co (cobalt), Fe (iron), Ta (tantalum), Cr (chromium), Rh (rhodium), Mo (molybdenum) and Nb (niobium), and a second soft magnetic layer containing at least Co in a group consisting of Ni, Co and Fe. In this case, it is desirable that the soft magnetic interlayer is formed in the first soft magnetic layer. The soft magnetic interlayer is thus formed in the first soft magnetic layer, whereby the coercive force can be further reduced.

Additionally, it is desirable that the soft magnetic interlayer contains at least one of oxide, nitride and nitride oxide. Thus, the soft magnetic interlayer can be magnetically stabilized, and therefore the variation in output can be reduced.

Moreover, it is desirable that the thickness of the soft magnetic interlayer is from 0.5 nm to 1.0 nm inclusive. Thus, the route for the electrons can be effectively limited, and therefore the higher rate of resistance change can be obtained.

Additionally, a ferromagnetic interlayer having the magnetism and the electrical resistance higher than the electrical resistance of the ferromagnetic layer may be formed in the ferromagnetic layer. In such a configuration, when the sense current flows through the magnetic transducer, the route for the electrons is further limited by the soft magnetic interlayer in the soft magnetic layer and the ferromagnetic interlayer in the ferromagnetic layer. As a consequence, the rate of resistance change is further increased. In this case, it is desirable that $0.2T_k \leq D_2 \leq 8T_k$, where $T_k$ represents the thickness of the ferromagnetic layer and $D_2$ represents the distance between the nonmagnetic layer and the ferromagnetic interlayer. Moreover, the distance $D_2$ between the nonmagnetic layer and the ferromagnetic interlayer may be from 0.6 nm to 3.6 nm inclusive. Thus, the rate of resistance change can be increased, and an exchange coupling magnetic field between the antiferromagnetic layer and the ferromagnetic layer can be sufficiently increased. Moreover, the thermal stability is high. This causes less deterioration in properties even if the manufacturing process includes the step of heat treatment. Accordingly, the high rate of resistance change can be obtained.

Another magnetic transducer of the invention including a nonmagnetic layer having a pair of facing surfaces, a soft magnetic layer formed on one surface of the nonmagnetic layer, a ferromagnetic layer formed on the other surface of the nonmagnetic layer and an antiferromagnetic layer formed on the ferromagnetic layer on the side opposite to the nonmagnetic layer comprises a ferromagnetic interlayer formed in the ferromagnetic layer and having magnetism and electrical resistance higher than the electrical resistance of the ferromagnetic layer, wherein $0.2T_k \leq D_2 \leq 0.8T_k$, where $T_k$ represents the thickness of the ferromagnetic layer and $D_2$ represents the distance between the nonmagnetic layer and the ferromagnetic interlayer.

Still another magnetic transducer of the invention including a nonmagnetic layer having a pair of facing surfaces, a soft magnetic layer formed on one surface of the nonmagnetic layer, a ferromagnetic layer formed on the other surface of the nonmagnetic layer and an antiferromagnetic layer formed on the ferromagnetic layer on the side opposite to the nonmagnetic layer comprises a ferromagnetic interlayer formed in the ferromagnetic layer and having magnetism and electrical resistance higher than the electrical resistance of the ferromagnetic layer, wherein the distance between the nonmagnetic layer and the ferromagnetic interlayer is from 0.6 nm to 3.6 nm inclusive.

In another magnetic transducer and still another magnetic transducer of the invention, when the sense current flows through the magnetic transducer, the electrons are reflected by the ferromagnetic interlayer formed in the ferromagnetic layer and thus the route for the electrons is limited. As a result, the rate of resistance change is increased. Moreover, the ferromagnetic interlayer has the magnetism. Thus, the respective magnetizations of two portions in the ferromagnetic layer facing each other across the ferromagnetic interlayer are fixed together by exchange coupling between the ferromagnetic layer and the antiferromagnetic layer. Consequently, the rate of resistance change can be increased, and the exchange coupling magnetic field between the antiferromagnetic layer and the ferromagnetic layer can be sufficiently increased. Moreover, the thermal stability is high. Thus, the effect that even if the manufacturing process includes the step of heat treatment, less deterioration in properties occurs and thus the high rate of resistance change can be obtained is achieved.

Another magnetic transducer and still another magnetic transducer of the invention can further adopt the following modes in addition to the above-described configuration.

That is, it is desirable that the ferromagnetic interlayer contains at least one of oxide, nitride and nitride oxide. Thus, the soft magnetic interlayer can be magnetically stabilized, and therefore the variation in output can be reduced. Moreover, it is desirable that the thickness of the ferromagnetic interlayer is from 0.5 nm to 1.0 nm inclusive. Thus, the route for the electrons can be effectively limited, and therefore the higher rate of resistance change can be obtained.

A thin film magnetic head of the invention comprises a magnetic transducer of the invention.

A method of manufacturing a magnetic transducer of the invention is a method of manufacturing a magnetic transducer including a nonmagnetic layer having a pair of facing surfaces, a soft magnetic layer formed on one surface of the nonmagnetic layer, a ferromagnetic layer formed on the other surface of the nonmagnetic layer and an antiferromagnetic layer formed on the ferromagnetic layer on the side opposite to the nonmagnetic layer. The method comprises the step of forming a soft magnetic interlayer having higher electrical resistance than the soft magnetic layer and magnetism, in the soft magnetic layer.

In a method of manufacturing a magnetic transducer of the invention, the magnetic transducer having the high rate of resistance change, the low coercive force and the excellent thermal stability can be easily manufactured.

A method of manufacturing a magnetic transducer of the invention can further adopt the following modes in addition to the above-described configuration.

That is, it is desirable that the soft magnetic interlayer is formed by partly oxidizing, nitriding or oxidizing and nitriding the soft magnetic layer. Thus, the good soft magnetic interlayer can be easily obtained.

Another method of manufacturing a magnetic transducer of the invention is a method of manufacturing a magnetic transducer including a nonmagnetic layer having a pair of facing surfaces, a soft magnetic layer formed on one surface of the nonmagnetic layer, a ferromagnetic layer formed on the other surface of the nonmagnetic layer and an antiferromagnetic layer formed on the ferromagnetic layer on the side opposite to the nonmagnetic layer. The method comprises the step of forming a ferromagnetic interlayer having higher electrical resistance than the ferromagnetic layer and magnetism in the ferromagnetic layer, wherein the ferromagnetic interlayer is formed at such a position that $0.2T_k \leq D_2 \leq 0.8T_k$ holds, where $T_k$ represents the thickness of the ferromagnetic layer and $D_2$ represents the distance between the nonmagnetic layer and the ferromagnetic interlayer.

Still another method of manufacturing a magnetic transducer of the invention is a method of manufacturing a magnetic transducer including a nonmagnetic layer having a pair of facing surfaces, a soft magnetic layer formed on one surface of the nonmagnetic layer, a ferromagnetic layer formed on the other surface of the nonmagnetic layer and an antiferromagnetic layer formed on the ferromagnetic layer on the side opposite to the nonmagnetic layer. The method comprises the step of forming a ferromagnetic interlayer having higher electrical resistance than the ferromagnetic layer and magnetism in the ferromagnetic layer, wherein the ferromagnetic interlayer is formed at such a position that the distance between the nonmagnetic layer and the ferromagnetic interlayer is from 0.6 nm to 3.6 nm inclusive.

In another method of manufacturing a magnetic transducer and still another method of manufacturing a magnetic transducer of the invention, the magnetic transducer having the high rate of resistance change and being excellent in thermal stability or the like can be easily manufactured.

The method of manufacturing a magnetic transducer of the invention can further adopt the following modes in addition to the above-described configuration.

That is, it is desirable that the ferromagnetic interlayer is formed by partly oxidizing, nitriding or oxidizing and nitriding the ferromagnetic layer. Thus, the good ferromagnetic interlayer can be easily obtained.

A method of manufacturing a thin film magnetic head of the invention uses a method of manufacturing a magnetic transducer of the invention in the step of forming the magnetic transducer.

Other and further objects, features and advantages of the invention will appear more fully from the following description.

BRIEF DESCRIPTION OF THE DRAWINGS

FIGS. 10A, 10B and 10C are cross sectional views for describing the following step of FIG. 9;

DETAILED DESCRIPTION OF THE PREFERRED EMBODIMENTS

Embodiments of the invention will be described in detail below with reference to the drawings.

First Embodiment

<Configuration of MR Element and Thin Film Magnetic Head>

First, the respective configurations of an MR element that is one specific example of a magnetic transducer according to a first embodiment of the invention and a thin film magnetic head using the same will be described with reference to FIGS. 1 to 7.

Figure 1:
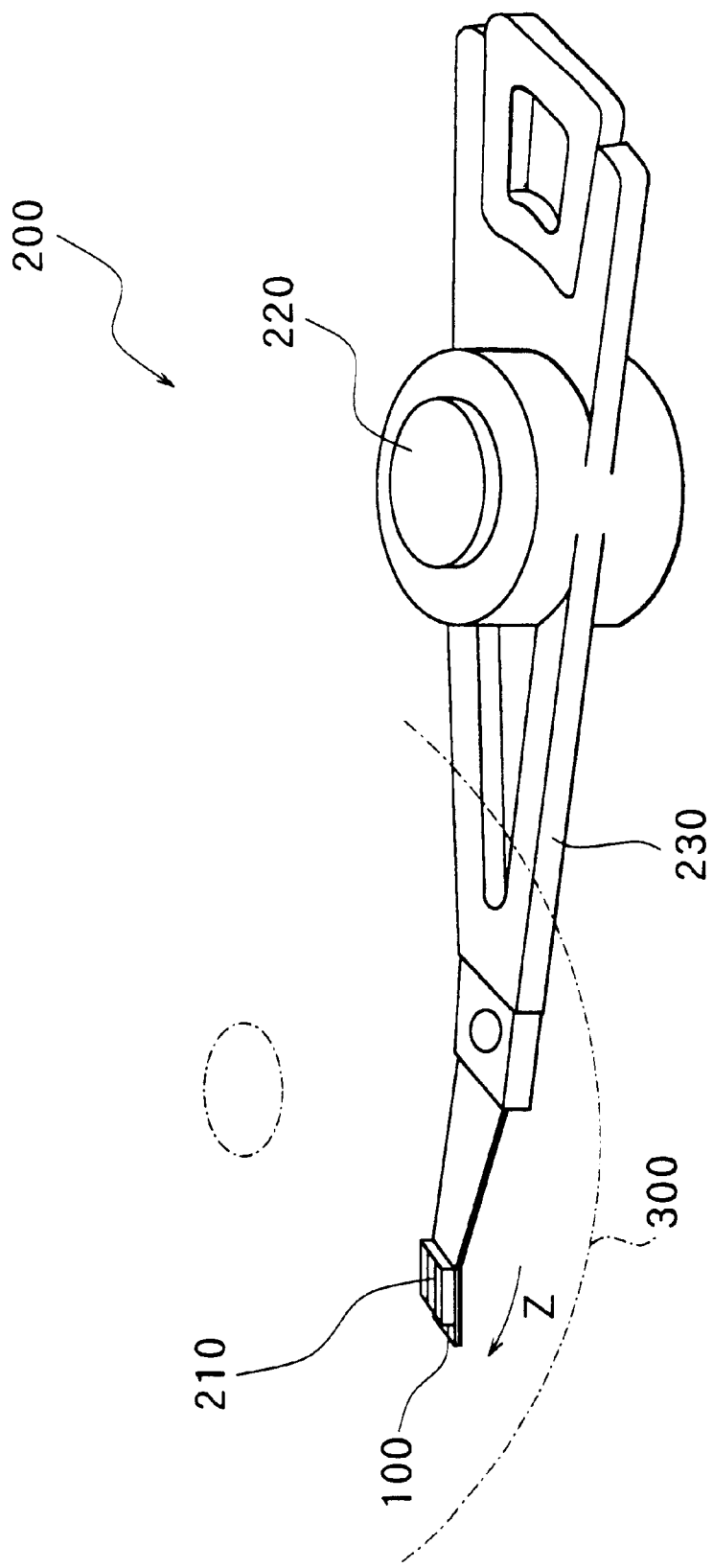
FIG. 1 is a perspective view of a configuration of an actuator arm comprising a thin film magnetic head including an MR element according to a first embodiment of the invention.

FIG. 1 shows the configuration of an actuator arm 200 comprising a thin film magnetic head 100 according to this embodiment. The actuator arm 200 is used in a hard disk drive not shown or the like, for example. The actuator arm 200 has a slider 210 on which the thin film magnetic head 100 is formed. For example, the slider 210 is mounted on the end of an arm section 230 rotatably supported by a supporting pivot 220. The arm section 230 rotates by a driving force of a voice coil motor not shown, for example. Thus, the slider 210 moves in a direction x in which the slider 210 crosses a track line along a recording surface of a magnetic recording medium 300 such as a hard disk (a lower surface of the recording surface in FIG. 1). For example, the magnetic recording medium 300 rotates in a direction z substantially perpendicular to the direction x in which the slider 210 crosses the track line. The magnetic recording medium 300 rotates and the slider 210 moves in this manner, whereby information is recorded on the magnetic recording medium 300 or the recorded information is readout from the magnetic recording medium 300.

Figure 2:
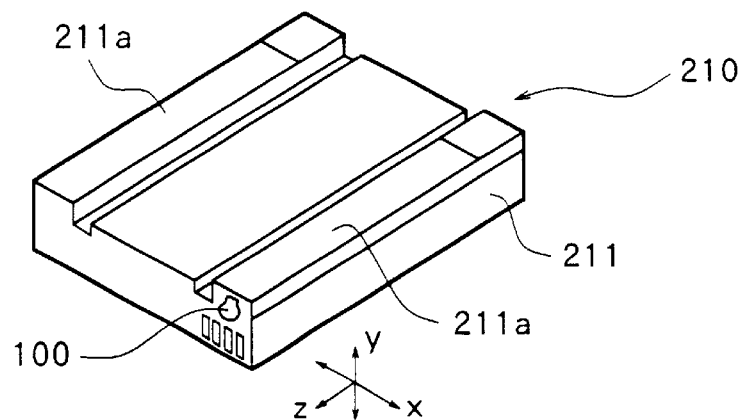
FIG. 2 is a perspective view of the configuration of a slider of the actuator arm shown in FIG. 1.

FIG. 2 shows the configuration of the slider 210 shown in FIG. 1. The slider 210 has a block-shaped base 211 made of $Al_2O_3$.TiC (altic), for example. The base 211 is formed into a substantially hexahedral shape, for instance. One face of this hexahedron is located so that the one face may closely face the recording surface of the magnetic recording medium 300 (see FIG. 1). The surface facing the recording surface of the magnetic recording medium 300 is called an air bearing surface (ABS) 211a. When the magnetic recording medium 300 rotates, the slider 210 moves a slight distance by an airflow generated between the recording surface of the magnetic recording medium 300 and the air bearing surface 211a so that the slider 210 may be separated from the recording surface in a direction y opposite to the recording surface. Thus, a fixed distance is provided between the air bearing surface 211a and the magnetic recording medium 300. The thin film magnetic head 100 is formed on one side surface (a left side surface in FIG. 2) of the air bearing surface 211a of the base 211.

Figure 3:
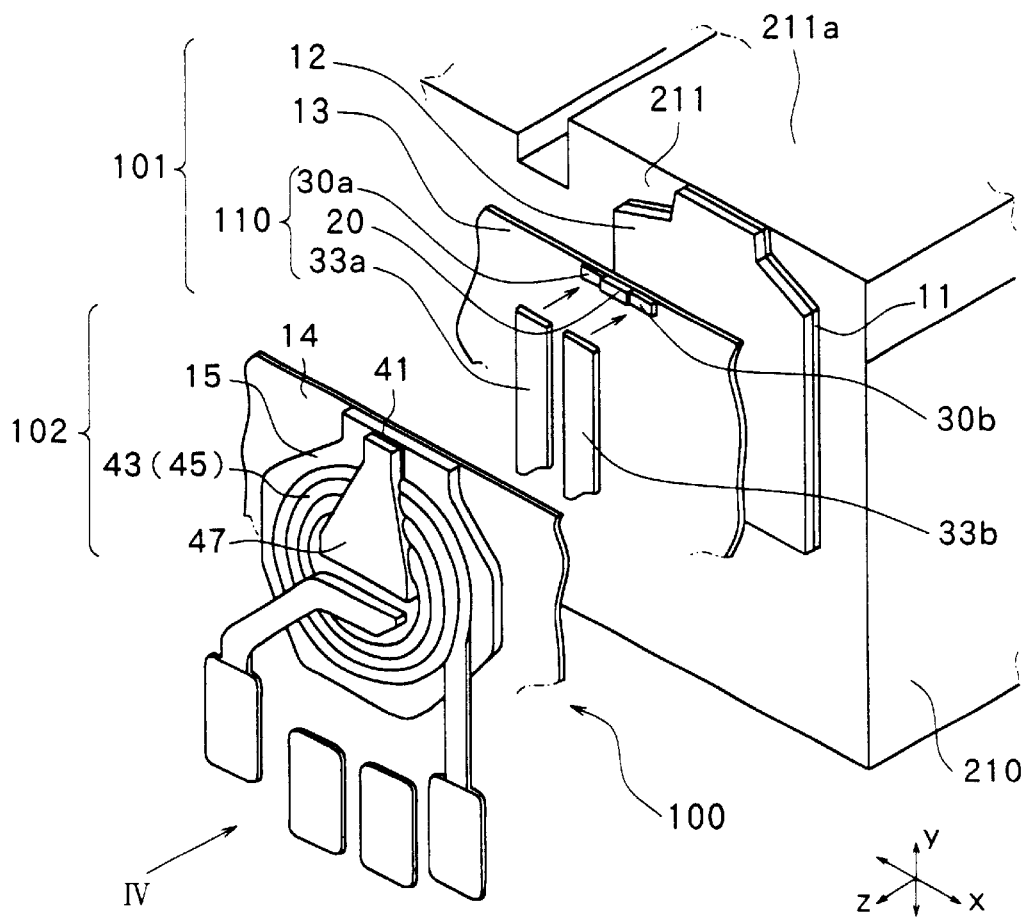
FIG. 3 is an exploded perspective view of the configuration of the thin film magnetic head according to the first embodiment.
Figure 4:
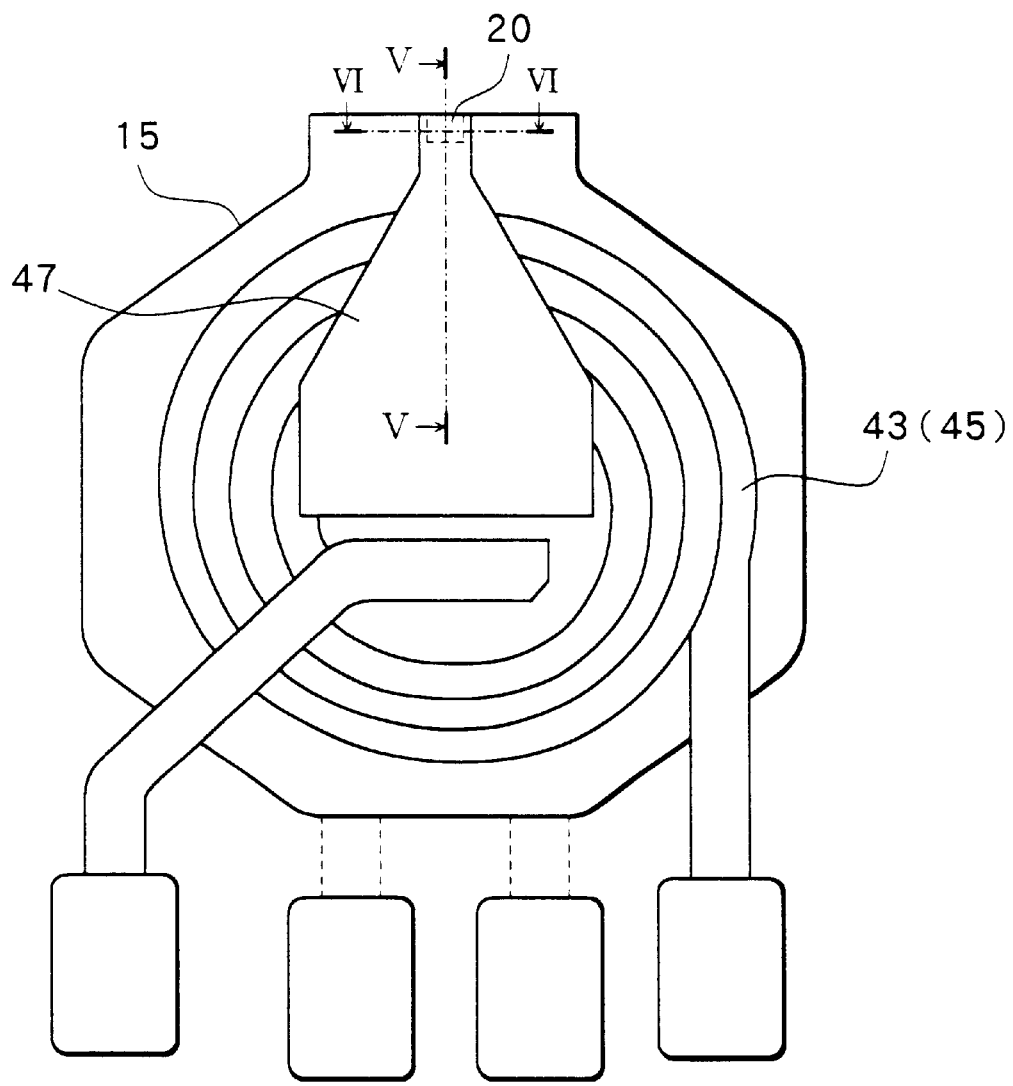
FIG. 4 is a plan view of a structure of the thin film magnetic head shown in FIG. 3 viewed from the direction of arrow IV.
Figure 5:
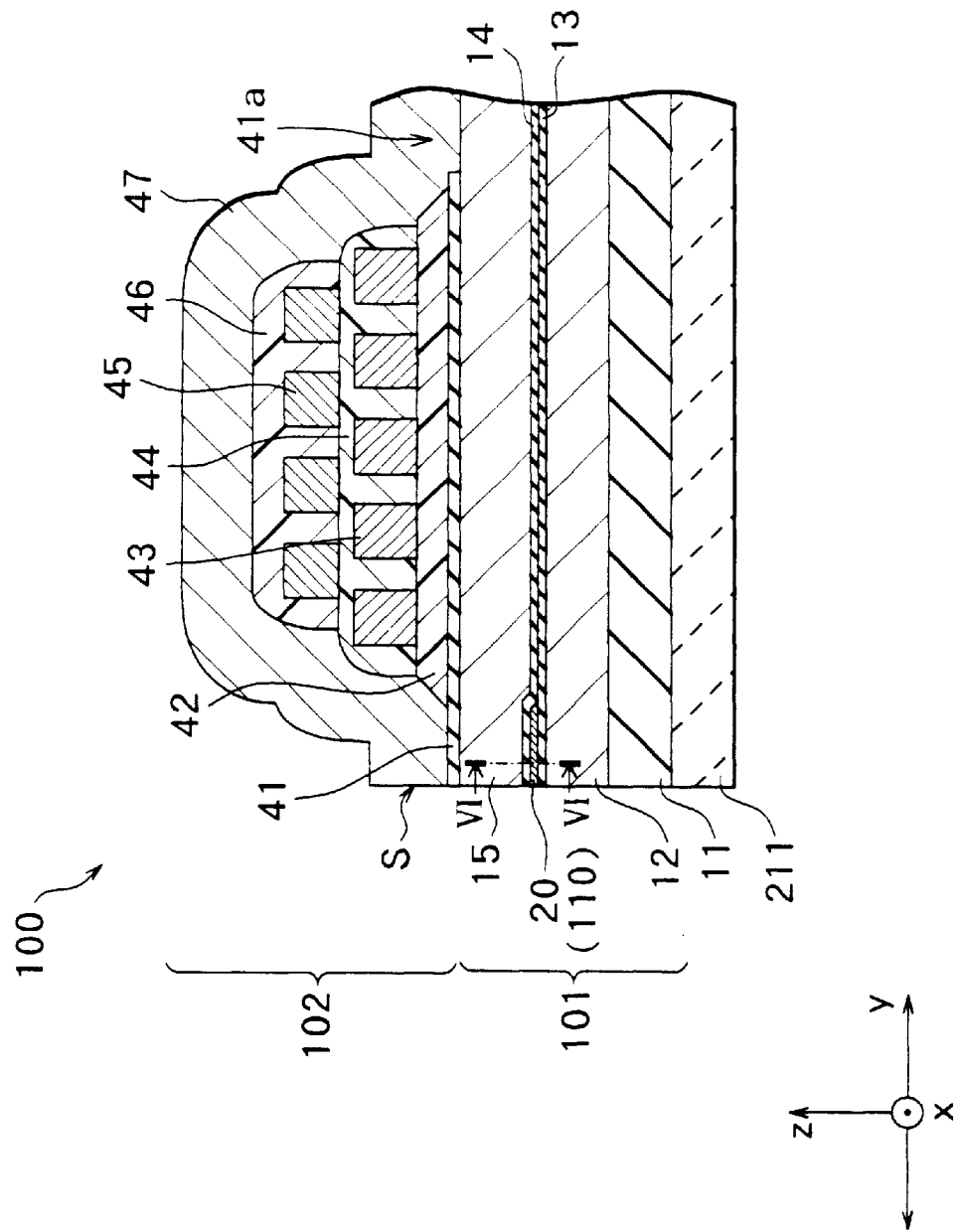
FIG. 5 is a cross sectional view taken in the direction of the arrows along the line V—V of FIG. 4, showing the structure of the thin film magnetic head shown in FIG. 3.
Figure 6:
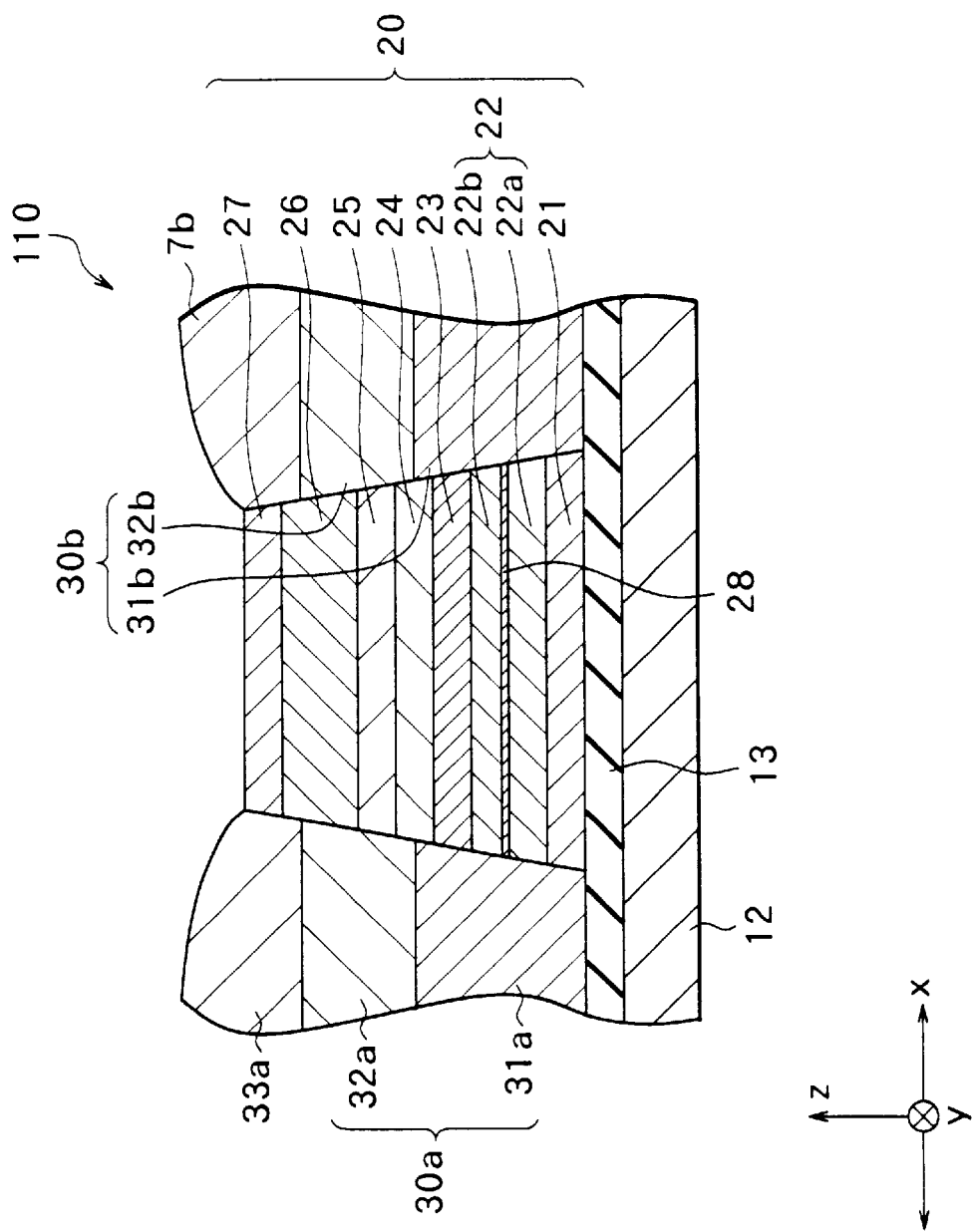
FIG. 6 is a cross sectional view taken in the direction of the arrows along the line VI—VI of FIG. 4, i.e., in the direction of the arrows along the line VI—VI of FIG. 5, showing the structure of the thin film magnetic head shown in FIG. 3.
Figure 7:
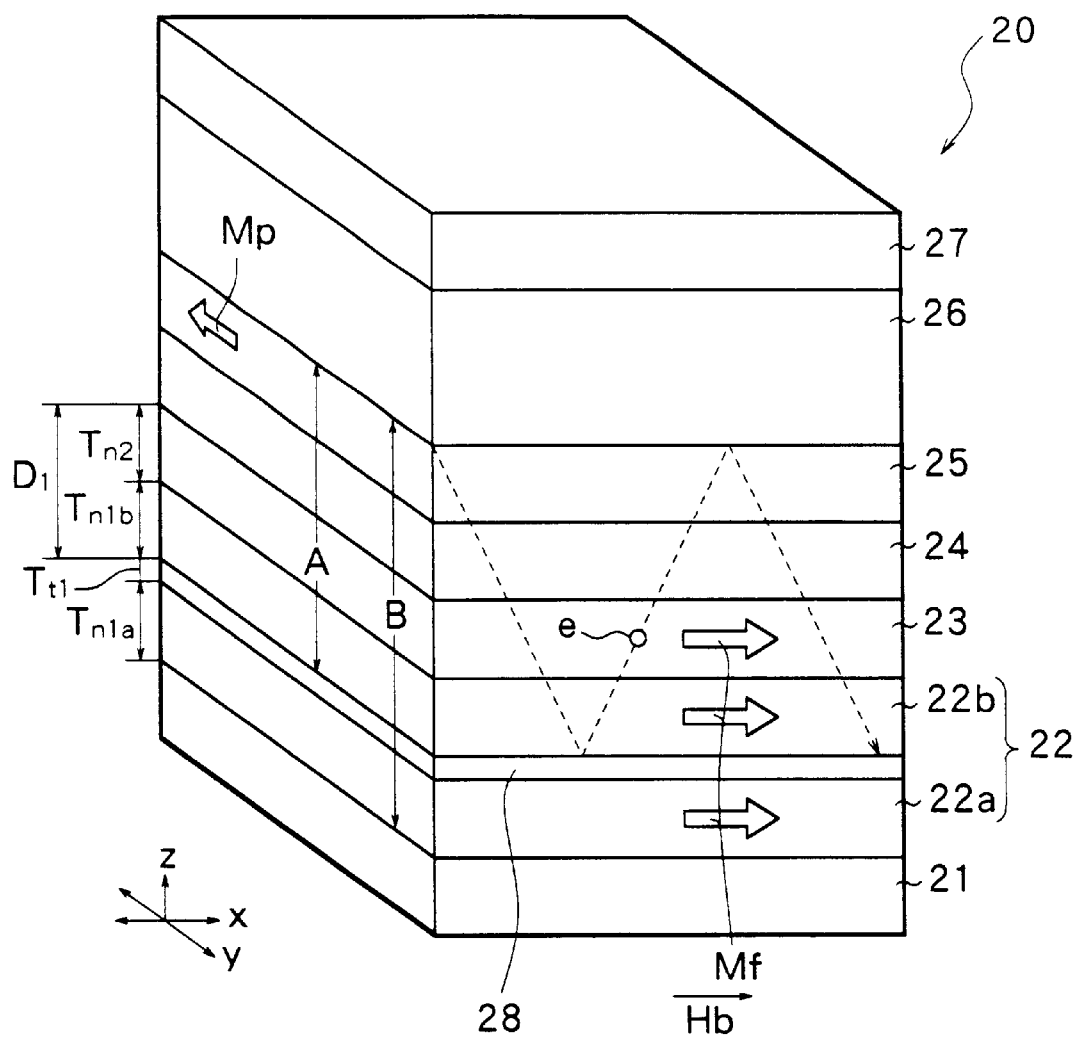
FIG. 7 is a perspective view of the structure of a stack of the MR element shown in FIG. 6.

FIG. 3 shows the exploded configuration of the thin film magnetic head 100. FIG. 4 shows a plan structure viewed from the direction of arrow IV of FIG. 3. FIG. 5 shows a sectional structure taken in the direction of the arrows along the line V—V of FIG. 4. FIG. 6 shows the sectional structure taken in the direction of the arrows along the line VI—VI of FIG. 4, i.e., in the direction of the arrows along the line VI—VI of FIG. 5. FIG. 7 shows a part of the structure shown in FIG. 6. The thin film magnetic head 100 has an integral structure comprising a reproducing head 101 for reproducing magnetic information recorded on the magnetic recording medium 300 and a recording head 102 for recording the magnetic information on the track line of the magnetic recording medium 300.

As shown in FIGS. 3 and 5, the reproducing head 101 has, for example, a stacked structure comprising an insulating layer 11, a bottom shield layer 12, a bottom shield gap layer 13, a top shield gap layer 14 and a top shield layer 15, the layers 11 to 15 being stacked in this order on the base 211 close to the air bearing surface 211a. For example, the insulating layer 11 is 2 $\mu$m to 10 $\mu$m in thickness in the direction of stack (hereinafter referred to as a thickness) and is made of $Al_2O_3$ (alumina). For example, the bottom shield layer 12 is 1 $\mu$m to 3 $\mu$m in thickness and is made of a magnetic material such as NiFe (a nickel-iron alloy: permalloy). For example, each of the bottom shield gap layer 13 and the top shield gap layer 14 is 10 nm to 100 nm in thickness and is made of $Al_2O_3$ or AlN (aluminum nitride). For example, the top shield layer 15 is 1 $\mu$m to 4 $\mu$m in thickness and is made of the magnetic material such as NiFe. The top shield layer 15 also functions as a bottom magnetic pole for the recording head 102.

An MR element 110 including a stack 20 that is a spin valve film is buried between the bottom shield gap layer 13 and the top shield gap layer 14 . The reproducing head 101 utilizes a change in electrical resistance in the stack 20 in response to a signal magnetic field from the magnetic recording medium 300, thereby reading the information recorded on the magnetic recording medium 300.

As shown in FIGS. 6 and 7, for example, the stack 20 has the stacked structure comprising an underlying layer 21, a first soft magnetic layer 22, a second soft magnetic layer 23, a nonmagnetic layer 24, a ferromagnetic layer 25, an antiferromagnetic layer 26 and a protective layer 27, the layers 21 to 27 being stacked in this order on the bottom shield gap layer 13. For example, the underlying layer 21 has a thickness of 5 nm and contains Ta.

For example, the first soft magnetic layer 22 is 1 nm to 8 nm in thickness and is made of the magnetic material containing at least Ni in a group consisting of Ni, Co, Fe, Ta, Cr, Rh, Mo and Nb. Specifically, it is preferable that the first soft magnetic layer 22 is composed of $[Ni_xCo_yFe_{100-(x+y)}]_{100-z}M_{Iz}$. In this formula, $M_I$ represents at least one of Ta, Cr, Rh, Mo and Nb, and x, y and z are within a range of $75 \leq x \leq 90$, $0 \leq y \leq 15$ and $0 \leq z \leq 15$ in units of atom %, respectively.

For example, the second soft magnetic layer 23 is 0.5 nm to 3 nm in thickness and is made of the magnetic material containing at least Co in a group consisting of Ni, Co and Fe. Specifically, it is preferable that the second soft magnetic layer 23 is composed of $Co_xFe_yNi_{100-(x+y)}$ whose (111) plane is oriented in the direction of stack. In this formula, x and y are within a range of $70 \leq x \leq 100$ and $0 \leq y \leq 25$ in units of atom %, respectively. Both of the first soft magnetic layer 22 and the second soft magnetic layer 23 compose a soft magnetic layer sometimes called a free layer. The orientation of the magnetic field of the soft magnetic layer is changed in response to the signal magnetic field from the magnetic recording medium 300. The thickness of the soft magnetic layer, i.e., the thickness of the first soft magnetic layer 22 plus the thickness of the second soft magnetic layer 23 is 3 nm to 8 nm, for instance.

For example, the nonmagnetic layer 24 is 1.8 nm to 3.0 nm in thickness and is made of a nonmagnetic material containing 80 wt % or more of at least one kind of element in a group consisting of Cu (copper), Au (gold) and Ag (silver). For example, the ferromagnetic layer 25 is 2 nm to 4.5 nm in thickness and is made of the magnetic material containing at least Co in a group consisting of Co and Fe. Preferably, the ferromagnetic layer 25 is made of the magnetic material whose (111) plane is oriented in the direction of stack. The ferromagnetic layer 25 is sometimes called a pinned layer, and the orientation of magnetization thereof is fixed by exchange coupling on an interface between the ferromagnetic layer 25 and the antiferromagnetic layer 26. In this embodiment, the orientation of the magnetization is fixed in the y-direction.

For example, the antiferromagnetic layer 26 is 5 nm to 30 nm in thickness and is made of an antiferromagnetic material containing at least one kind of element $M_{II}$ in a group consisting of Pt (platinum), Ru C(ruthenium), Rh, Pd (palladium), Ni, Au, Ag, Cu, Ir (iridium), Cr and Fe, and manganese (Mn). Preferably, a content of Mn is from 45 atom % to 95 atom % inclusive and a content of the other element $M_{II}$ is from 5 atom % to 65 atom % inclusive. Such antiferromagnetic materials include a non-heat-treatment type antiferromagnetic material which exhibits antiferromagnetism without heat treatment and induces an exchange coupling magnetic field between a ferromagnetic material and the antiferromagnetic material, and a heat-treatment type antiferromagnetic material which exhibits the antiferromagnetism with the heat treatment. The antiferromagnetic layer 26 may be made of either antiferromagnetic material.

Non-heat-treatment type antiferromagnetic materials include an Mn alloy having a γ-phase, and so on. Specifically, such materials include RuRhMn (a rutheniumrhodium-manganese alloy), FeMn (an iron-manganese alloy), IrMn (an iridium-manganese alloy) or the like. Heat-treatment type antiferromagnetic materials include the Mn alloy having regular crystal structures, and so on. Specifically, such materials include PtMn (a platinum-manganese alloy), NiMn (a nickel-manganese alloy), PtRhMn (a platinum-rhodium-manganese alloy) and so on. The protective layer 27 is 5 nm in thickness and is made of Ta, for example.

In the stack 20, the first soft magnetic layer 22 is divided into a first lower layer 22a and a first upper layer 22b in the direction of stack. A soft magnetic interlayer 28, which has magnetism and the electrical resistance higher than the electrical resistance of the first soft magnetic layer 22, is sandwiched between the first lower layer 22a and the first upper layer 22b, i.e., in the first soft magnetic layer 22. When a sense current flows through the stack 20, the soft magnetic interlayer 28 reflects at least some electrons e and thus limits a route for the electrons e, thereby increasing a rate of resistance change of the stack 20. In this embodiment, the soft magnetic interlayer 28 is thus included in the first soft magnetic layer 22, whereby the rate of resistance change can be increased while keeping a low coercive force.

For example, the soft magnetic interlayer 28 is made of the material having the electrical resistance higher than the electrical resistance of the material making the first soft magnetic layer 22, whereby the soft magnetic interlayer 28 has the electrical resistance higher than the electrical resistance of the first soft magnetic layer 22. Preferably, the soft magnetic interlayer 28 contains at least one of oxide, nitride and nitride oxide, for example, because these materials are magnetically stable and can reduce a variation in output. Preferably, the soft magnetic interlayer 28 has some common elements with the first soft magnetic layer 22, for example. Specifically, it is preferable that the soft magnetic interlayer 28 contains at least Ni in a group consisting of Ni, Co, Fe, Ta, Cr, Rh, Mo and Nb and at least one kind of element in a group consisting of O (oxygen) and N (nitrogen). For example, the first soft magnetic layer 22 is partly oxidized, nitrided or oxidized and nitrided, whereby the good soft magnetic interlayer 28 can be easily obtained. Preferably, a thickness $T_{t1}$ of the soft magnetic interlayer 28 is from 0.5 nm to 1.0 nm inclusive, for example. Too thick a soft magnetic interlayer 28 weakens magnetic coupling between the first lower layer and the first upper layer. As a result, a high rate of resistance change cannot be obtained and also the coercive force is increased. Too thin a soft magnetic interlayer 28 cannot sufficiently limit the route for the electrons, and thus the high rate of resistance change cannot be obtained.

Preferably, the soft magnetic interlayer 28 is positioned so that a distance D, between the soft magnetic interlayer 28 and the nonmagnetic layer 24 may be within a range of $0.3T_n \leq D_1 < T_n$, where $T_n$ represents the thickness of the soft magnetic layer. In this embodiment, the thickness $T_n$ of the soft magnetic layer is equal to a thickness $T_{n1a}$ of the first upper layer 22a plus a thickness $T_{n1b}$ of the first upper layer 22b plus a thickness $T_{n2}$ of the second soft magnetic layer 23. In this embodiment, the distance $D_1$ between the soft magnetic interlayer 28 and the nonmagnetic layer 24 is equal to the thickness $T_{n1b}$ of the first upper layer 22b plus the thickness $T_{n2}$ of the second soft magnetic layer 23. Preferably, the distance $D_1$ between the soft magnetic interlayer 28 and the nonmagnetic layer 24 is within a range of from 1 nm to 8 nm inclusive expressed in a specific numerical value. If the distance $D_1$ is longer than this range, an effect of limiting the route for the electrons e cannot be fully obtained and thus the high rate of resistance change cannot be obtained. If the distance $D_1$ is shorter than this range, the electrons e are excessively concentrated on a narrow range and thus efficiency is decreased. As a result, the rate of resistance change is reduced.

Magnetic domain control films 30a and 30b are formed on both the sides of the stack 20, i.e., on both sides in the direction perpendicular to the direction of stack. Thus, the magnetizations of the first soft magnetic layer 22 and the second soft magnetic layer 23 are oriented in the same direction, so that a single magnetic domain is formed and thus the so-called Barkhausen noise is prevented. The magnetic domain control film 30a has the stacked structure comprising a magnetic domain controlling ferromagnetic film 31a and a magnetic domain controlling antiferromagnetic film 32a, the films 31a and 32a being stacked in this order on the bottom shield gap layer 13. The magnetic domain control film 30b also has the same structure as the magnetic domain control film 30a. The orientations of the magnetizations of the magnetic domain controlling ferromagnetic films 31a and 31b are fixed by the exchange coupling on the interfaces between the magnetic domain controlling ferromagnetic films 31a and 31b and the magnetic domain controlling antiferromagnetic films 32a and 32b. Thus, for example, as shown in FIG. 7, a biasing magnetic field Hb to the first soft magnetic layer 22 and the second soft magnetic layer 23 is generated in the x-direction near the magnetic domain controlling ferromagnetic films 31a and 31b.

For example, each of the magnetic domain controlling ferromagnetic films 31a and 31b is 10 nm to 50 nm in thickness and is formed in accordance with the first soft magnetic layer 22 and the second soft magnetic layer 23. Moreover, for example, each of the magnetic domain controlling ferromagnetic films 31a and 31b is made of NiFe, a stacked film of NiFe and Co, the magnetic material containing Ni, Fe and Co, or the like. For example, each of the magnetic domain controlling antiferromagnetic films 32a and 32b is 5 nm to 30 nm in thickness and is made of the antiferromagnetic material. Although this antiferromagnetic material may be the non-heat-treatment type antiferromagnetic material or the heat-treatment type antiferromagnetic material, the non-heat-treatment type antiferromagnetic material is preferable.

A hard magnetic material (a hard magnet) such as TiW/CoPt (a cobalt-platinum alloy) or TiW/CoCrPt (a cobalt-chromium-platinum alloy) may be used as the magnetic domain control films 30a and 30b.

The lead layers 33a and 33b comprising the stacked film of Ta and Au, the stacked film of TiW (a titanium-tungsten alloy) and Ta, the stacked film of TiN (titanium nitride) and Ta, or the like are formed on the magnetic domain control films 30a and 30b, respectively. Thus, the current can be fed through the stack 20 through the magnetic domain control films 30a and 30b.

As shown in FIGS. 3 and 5, for example, the recording head 102 has a recording gap layer 41 comprising an insulating film of $Al_2O_3$ or the like and having a thickness of 0.1 μm to 0.5 μm, on the top shieldlayer 15. The recording gap layer 41 has an opening 41a at the position corresponding to the center of thin film coils 43 and 45 described below. The thin film coil 43 of 1 μm to 3 μm thick and a photoresist layer 44 for coating the thin film coil 43 are formed on the recording gap layer 41 sandwiching a photoresist layer 42 of 1.0 μm to 5.0 μm thick for determining a throat height. The thin film coil 45 of 1 μm to 3 μm thick and a photoresist layer 46 for coating the thin film coil 45 are formed on the photoresist layer 44. Although two thin film coils are stacked as an example in this embodiment, the number of the stacked thin film coils may be one, three or more.

A top magnetic pole 47 of about 3 μm thick made of the magnetic material having high saturation magnetic flux density, such as NiFe or FeN (iron nitride), for example, is formed on the recording gap layer 41 and the photoresist layers 42, 44 and 46. The top magnetic pole 47 is in contact with and magnetically coupled to the top shield layer 15 sandwiching the opening 41a of the recording gap layer 41 located at the position corresponding to the center of the thin film coils 43 and 45. Although not shown in FIGS. 3 to 6, an overcoat layer (an overcoat layer 48 in FIG. 16) of 20 μm to 30 μm thick made of $Al_2O_3$, for example, is formed on the top magnetic pole 47 so that the whole top magnetic pole 47 may be coated with the overcoat layer. Thus, the recording head 102 generates the magnetic flux between the top shield layer 15, which is the bottom magnetic pole, and the top magnetic pole 47 by the current flowing through the thin film coils 43 and 45, and the recording head 102 magnetizes the magnetic recording medium 300 by the magnetic flux generated near the recording gap layer 41, whereby the recording head 102 records the information on the magnetic recording medium 300.

<Operation of MR Element and Thin Film Magnetic Head>

Next, a reproducing operation by the MR element 110 and the thin film magnetic head 100 thus configured will be described by mainly referring to FIGS. 6 and 7.

In the thin film magnetic head 100, the information recorded on the magnetic recording medium 300 is readout by the reproducing head 101. In the reproducing head 101, the orientation of magnetization Mp of the ferromagnetic layer 25, for example, is fixed in the y-direction by the exchange coupling magnetic field generated by the exchange coupling on the interface between the ferromagnetic layer 25 and the antiferromagnetic layer 26 of the stack 20. Moreover, magnetizations Mf of the first soft magnetic layer 22, the second soft magnetic layer 23 and the soft magnetic interlayer 28 are oriented in the direction of the biasing magnetic field Hb (in the x-direction) by the biasing magnetic field Hb generated by the magnetic domain control films 30a and 30b. The direction of the biasing magnetic field Hb is substantially perpendicular to the orientation of the magnetization Mp of the ferromagnetic layer 25.

In reading information, the sense current that is a stationary current is fed through the stack 20 through the lead layers 33a and 33b in the direction of the biasing magnetic field Hb, for example. At this time, most of the electrons e move mainly through the nonmagnetic layer 24 between the first soft magnetic layer 22 having low electrical resistance and the ferromagnetic layer 25. However, since the electrical resistance of the soft magnetic interlayer 28 is higher than that of the first soft magnetic layer 22, at least some of the electrons e moving from the first upper layer 22b toward the soft magnetic interlayer 28 are reflected by the surface of the soft magnetic interlayer 28. That is, the current flows mainly through the first upper layer 22b, the second soft magnetic layer 23, the nonmagnetic layer 24 and the ferromagnetic layer 25.

Receiving the signal magnetic field from the magnetic recording medium 300, the orientations of the magnetizations Mf of the first soft magnetic layer 22, the second soft magnetic layer 23 and the soft magnetic interlayer 28 are changed. Although the first soft magnetic layer 22 is divided into the first lower layer 22a and the first upper layer 22b by the soft magnetic interlayer 28, the orientations of the magnetizations Mf of the first lower layer 22a and the first upper layer 22b are integrally changed together because the soft magnetic interlayer 28 has the magnetism. On the other hand, since the orientation of the magnetization Mp of the ferromagnetic layer 25 is fixed by the antiferromagnetic layer 26, the orientation is not changed even receiving the signal magnetic field from the magnetic recording medium 300.

When the orientation of the magnetization Mf is thus changed, the current flowing through the stack 20 is subjected to the resistance in accordance with a relative angle between the orientation of the magnetization Mf of the first soft magnetic layer 22, the second soft magnetic layer 23 and the soft magnetic interlayer 28 and the orientation of the magnetization Mp of the ferromagnetic layer 25. This is caused by a phenomenon called "spin depending scattering". The spin depending scattering means that the degree of electron scattering on the interface between the nonmagnetic layer and the magnetic layer depends on the direction of the magnetization of the magnetic layer. An amount of change in the resistance of the stack 20 is detected as an amount of change in voltage, and thus the information recorded on the magnetic recording medium 300 is readout.

Figure 8:
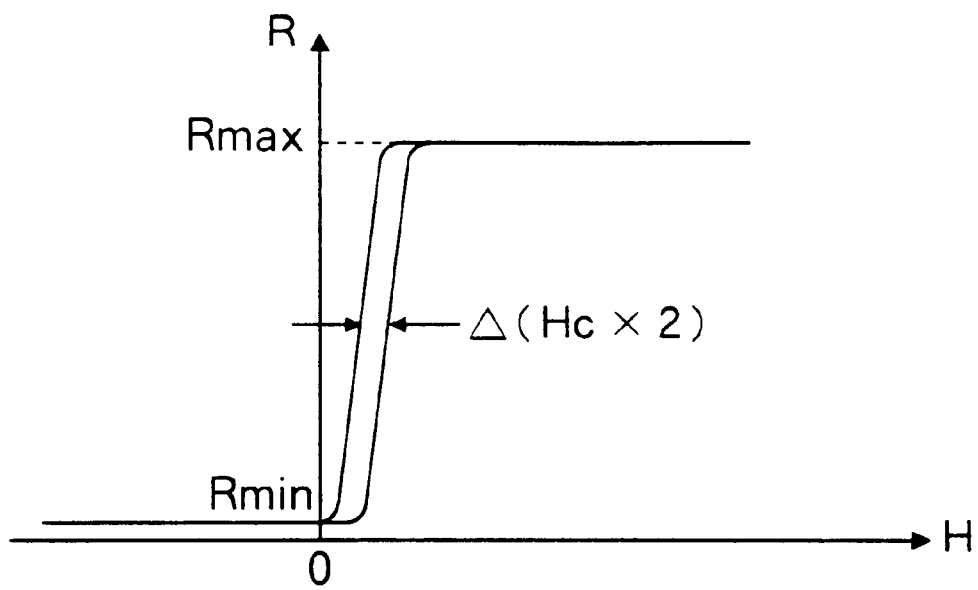
FIG. 8 is a plot of a relationship between an external magnetic field and electrical resistance of the MR element using the stack shown in FIG. 7.

FIG. 8 shows one example of a relationship between the signal magnetic field and the resistance of the stack 20 in this embodiment. When a maximum value of the resistance of the stack 20 is taken as Rmax and a minimum value of the resistance thereof is taken as Rmin, the rate of resistance change is expressed as (Rmax-Rmin)/Rmin×100. In the drawing, a width of hysteresis indicated by reference symbol Δ is equivalent to double a coercive force Hc which is obtained when the first soft magnetic layer 22, the second soft magnetic layer 23 and the soft magnetic interlayer 28 are considered as one soft magnetic layer. In the following description, "the coercive force Hc of the soft magnetic layer" is defined as ½ of the width Δ of the hysteresis on a curve (the so-called MR curve) representing the relationship between the signal magnetic field and the resistance of the stack 20.

If the soft magnetic interlayer 28 is not provided, a main path for the electrons e in the stack 20 is in the range indicated by arrow B in FIG. 7, i.e., the range including the first lower layer 22a, the first upper layer 22b, the second soft magnetic layer 23, the nonmagnetic layer 24 and the ferromagnetic layer 25. On the other hand, in this embodiment, the soft magnetic interlayer 28 is provided in the first soft magnetic layer 22. Thus, the main path for the electrons e is limited to the range indicated by arrow A in FIG. 7, i.e., the range including the first upper layer 22b, the second soft magnetic layer 23, the nonmagnetic layer 24 and the ferromagnetic layer 25. Thus, since the electrons are concentrated on the interface between the nonmagnetic layer and the magnetic layer, the number of electrons contributing to "the spin depending scattering" is increased. Consequently, the rate of resistance change is increased.

Furthermore, the orientations of the magnetizations Mf of the second soft magnetic layer 23, the first upper layer 22b and the first lower layer 22a are integrally changed because of the magnetism of the soft magnetic interlayer 28. Thus, the coercive force Hc of the whole soft magnetic layer (the first soft magnetic layer 22, the second soft magnetic layer 23 and the soft magnetic interlayer 28) can be reduced. Since the coercive force Hc can be thus reduced, higher precision of repeatability can be obtained.

<Method of Manufacturing MR Element and Thin Film Magnetic Head>

Figure 9:
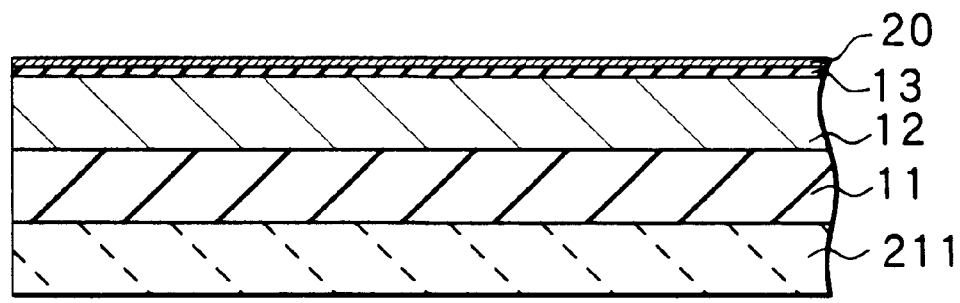
FIG. 9 is a cross sectional view for describing one step of a method of manufacturing the thin film magnetic head shown in FIG. 3.

Next, a method of manufacturing the MR element 110 and the thin film magnetic head 100 will be described with reference to FIGS. 9 to 14. FIGS. 9, 13 and 14 show the sectional structure taken along the line V—V of FIG. 4. FIGS. 10A to 12B show the sectional structure taken along the line VI—VI of FIG. 4.

In the manufacturing method according to this embodiment, first, as shown in FIG. 9, for example, the insulating layer 11 made of $Al_2O_3$ is deposited with a thickness of about 2 μm to 10 μm on one side surface of the base 211 made of $Al_2O_3$.TiC by sputtering. Then, the bottom shield layer 12 made of the magnetic material is formed with a thickness of 1 μm to 3 μm on the insulating layer 11 by plating, for example. Then, the bottom shield gap layer 13 made of $Al_2O_3$ or AlN is deposited with a thickness of 10 nm to 100 nm on the bottom shield layer 12 by sputtering, for example. Then, the stack 20 is formed on the bottom shield gap layer 13.

A process of forming the stack 20 will be described in detail. First, as shown in FIG. 10A, the underlying layer 21 and the first lower layer 22a are deposited in sequence on the bottom shield gap layer 13 by using the materials described in a section of the configuration by sputtering, for example. This process takes place in a vacuum chamber not shown, for example, under vacuum at an ultimate pressure of about $10^{-10}$ Torr to $10^{-8}$ Torr and a deposition pressure of about $10^{-5}$ Torr to $10^{-2}$ Torr.

Then, for example, at least one of oxygen gas and nitrogen gas is introduced into the vacuum chamber not shown so that a degree of vacuum may be about 0.0001 Torr to 760 Torr. Then, for example, in this state, the surface of the first lower layer 22a is exposed to an atmosphere containing at least one of oxygen and nitrogen for 0.01 minute to 60 minutes. Thus, for example, as shown in FIG. 10B, the surface of the first lower layer 22a is oxidized, nitrided or oxidized and nitrided, so that the good soft magnetic interlayer 28 is easily deposited. With the formation of the soft magnetic interlayer 28, the first lower layer 22a becomes thinner than the first-deposited first lower layer 22a. In this step of oxidation, nitriding or oxidation and nitriding, preferably the degree of vacuum in the vacuum chamber is set at 0.001 Torr to 200 Torr, or more preferably the time of exposure of the surface of the first lower layer 22a is set at 0.1 minute to 30 minutes. Under such conditions, the film thickness can be easily controlled and thus the good soft magnetic interlayer 28 can be easily obtained.

After the soft magnetic interlayer 28 is formed, for example, the vacuum chamber not shown is reduced again in pressure so as to produce a high vacuum in the vacuum chamber. In such a high vacuum, as shown in FIG. 10C, the first upper layer 22b, the second soft magnetic layer 23, the nonmagnetic layer 24, the ferromagnetic layer 25, the antiferromagnetic layer 26 and the protective layer 27 are deposited in sequence on the soft magnetic interlayer 28 by using the materials described in the section of the configuration by sputtering. To form the antiferromagnetic layer 26 by the non-heat-treatment type antiferromagnetic material, the antiferromagnetic layer 26 is formed with the magnetic field applied in the y-direction, for example. Thus, the orientation of the magnetization of the ferromagnetic layer 25 is fixed in the direction of the applied magnetic field, i.e., the y-direction by the exchange coupling between the ferromagnetic layer 25 and the antiferromagnetic layer 26.

Figure 11A:
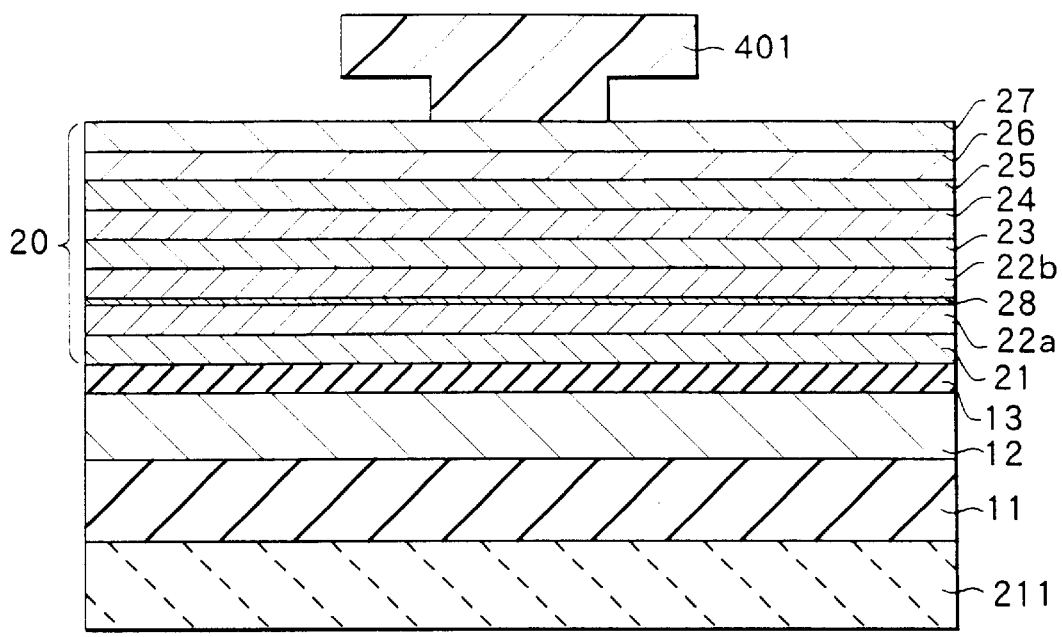
FIGS. 11A and 11B are cross sectional views for describing the following step of FIG. 10C.

After that, as shown in FIG. 11A, for example, a photoresist film 401 is selectively formed on the protective layer 27 in accordance with a region where the stack 20 is to be formed. Preferably, for example, the photoresist film 401 is formed into T-shape in cross section by forming a trench on the interface between the photoresist film 401 and the protective layer 27 so that lift-off procedures discussed below can be facilitated.

Figure 11B:
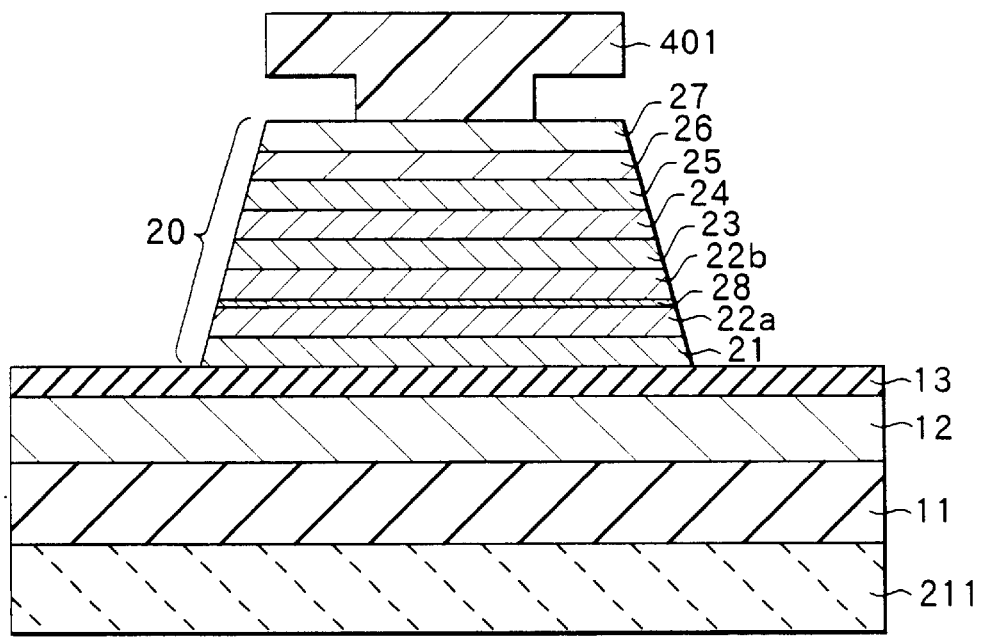

After the photoresist film 401 is formed, as shown in FIG. 11B, the protective layer 27, the antiferromagnetic layer 26, the ferromagnetic layer 25, the nonmagnetic layer 24, the second soft magnetic layer 23, the first upper layer 22b, the soft magnetic interlayer 28, the first lower layer 22a and the underlying layer 21 are etched in sequence and selectively removed by, for example, ion milling using the photoresist film 401 as a mask. Thus, each of the layers 21, 22a, 28, 22b, 23, 24, 25, 26 and 27 is formed, so that the stack 20 is formed.

Figure 12A:
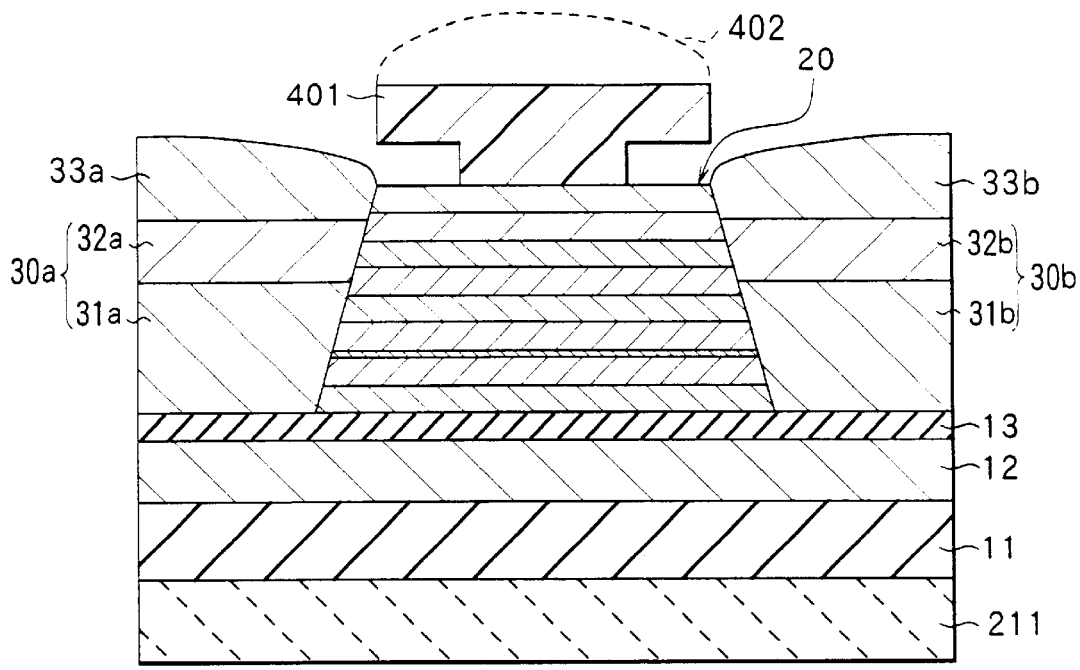
FIGS. 12A and 12B are cross sectional views for describing the following step of FIG. 11B.

After the stack 20 is formed, as shown in FIG. 12A, the magnetic domain controlling ferromagnetic films 31a and 31b and the magnetic domain controlling antiferromagnetic films 32a and 32b are formed in sequence on both sides of the stack 20 by sputtering, for example. To form the magnetic domain controlling antiferromagnetic films 32a and 32b by the non-heat-treatment type antiferromagnetic material, the magnetic domain controlling antiferromagnetic films 32a and 32b are formed with the magnetic field applied in the x-direction, for example. Thus, the orientations of the magnetizations of the magnetic domain controlling ferromagnetic films 31a and 31b are fixed in the direction of the applied magnetic field, i.e., the x-direction by the exchange coupling between the magnetic domain controlling ferromagnetic films 31a and 31b and the magnetic domain controlling antiferromagnetic films 32a and 32b.

Instead of the magnetic domain controlling ferromagnetic films 31a and 31b and the magnetic domain controlling antiferromagnetic films 32a and 32b, the hard magnetic material (the hard magnet) such as TiW/CoPt or TiW/CoCrPt may be formed by sputtering, for instance.

After the magnetic domain control films 30a and 30b are formed, as similarly shown in FIG. 12A, the lead layers 33a and 33b are formed on the magnetic domain controlling antiferromagnetic films 32a and 32b, respectively, by sputtering, for example. Then, the photoresist film 401 and a deposit 402 stacked thereon (the materials of the magnetic domain controlling ferromagnetic film, the magnetic domain controlling antiferromagnetic film and the lead layer) are removed by lift-off, for example.

Figure 12B:
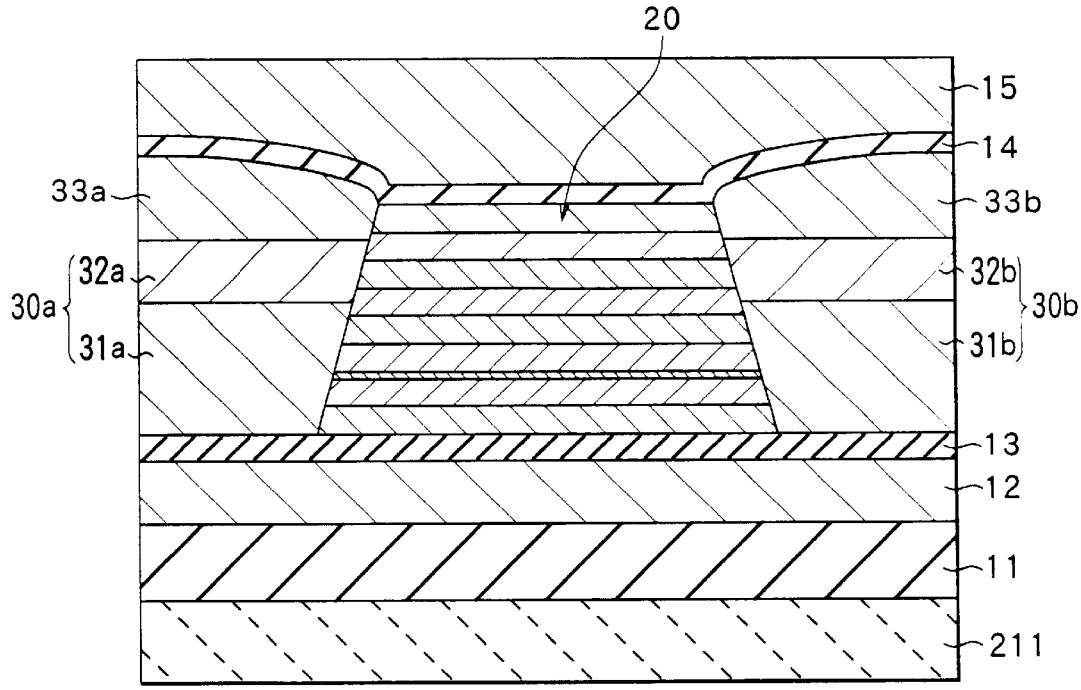
Figure 13A:
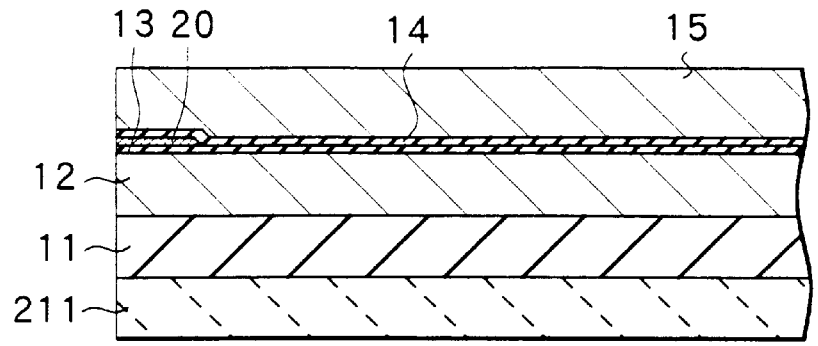
FIGS. 13A and 13B are cross sectional views for describing the following step of FIG. 12B.

After lift-off, as shown in FIGS. 12B and 13A, the top shield gap layer 14 made of the insulating film of AlN or the like is formed with a thickness of about 10 nm to 100 nm by, for example, sputtering so that the bottom shield gap layer 13 and the stack 20 may be coated with the top shield gap layer 14. Thus, the stack 20 is buried between the bottom shield gap layer 13 and the top shield gap layer 14. Then, the top shield layer 15 made of the magnetic material is formed with a thickness of about 1 μm to 4 μm on the top shield gap layer 14 by sputtering, for example.

Figure 13B:
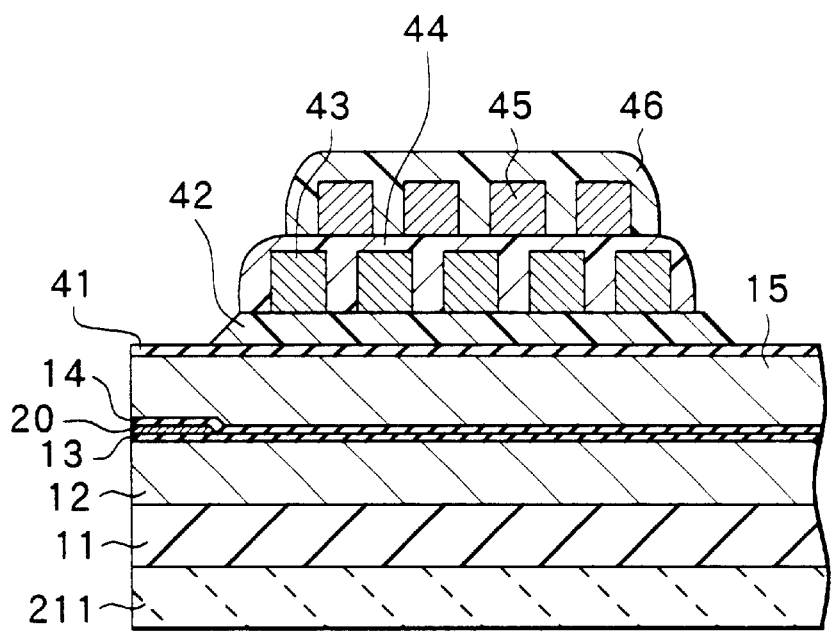

After the top shield layer 15 is formed, as shown in FIG. 13B, the recording gap layer 41 made of the insulating film is formed with a thickness of 0.1 μm to 0.5 μm on the top shield layer 15 by sputtering, for example. The photoresist layer 42 is formed into a predetermined pattern with a film thickness of about 1.0 μm to 2.0 μm on the recording gap layer 41. After the photoresist layer 42 is formed, the thin film coil 43 is formed with a film thickness of 1 μm to 3 μm on the photoresist layer 42. The photoresist layer 44 is formed into a predetermined pattern so that the thin film coil 43 may be coated with the photoresist layer 44. After the photoresist layer 44 is formed, the thin film coil 45 is formed with a film thickness of 1 μm to 3 μm on the photoresist layer 44. The photoresist layer 46 is formed into a predetermined pattern so that the thin film coil 45 may be coated with the photoresist layer 46.

Figure 14A:
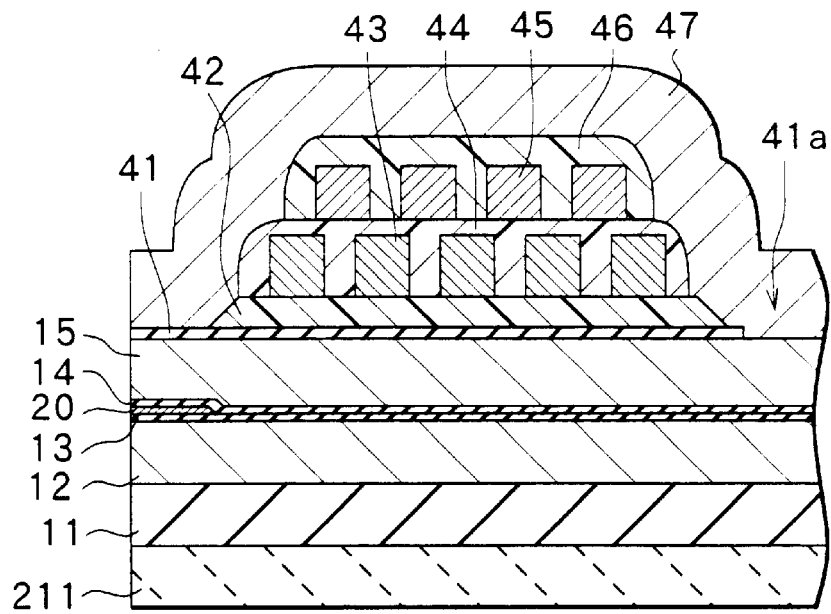
FIGS. 14A and 14B are cross sectional views for describing the following step of FIG. 13B.
Figure 14B:
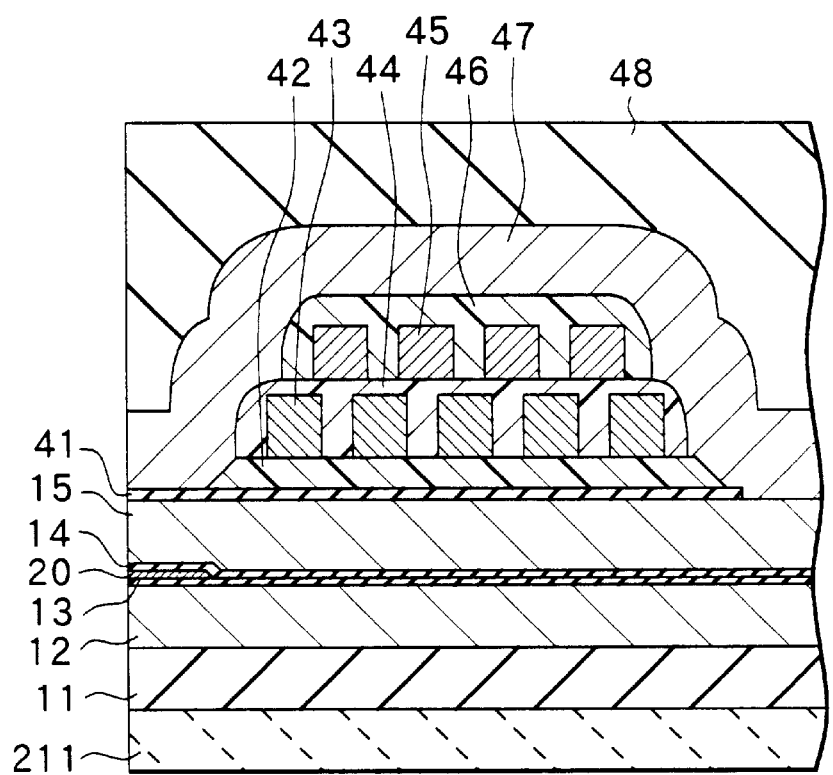

After the photoresist layer 46 is formed, as shown in FIG. 14A, for example, the recording gap layer 41 is partially etched at the position corresponding to the center of the thin film coils 43 and 45, whereby the opening 41a for forming a flux path is formed. After that, for instance, the top magnetic pole 47 made of the magnetic material having the high saturation magnetic flux density is formed with a thickness of about 3 μm so that the recording gap layer 41, the opening 41a and the photoresist layers 42, 44 and 46 may be coated with the top magnetic pole 47. After the top magnetic pole 47 is formed, the recording gap layer 41 and the top shield layer 15 are selectively etched by the ion milling using the top magnetic pole 47 as the mask, for example. Then, as shown in FIG. 14B, the overcoat layer 48 made of alumina is formed with a film thickness of 20 μm to 30 μm on the top magnetic pole 47.

After the overcoat layer 48 is formed, the process of antiferromagnetizing for fixing the orientations of the magnetic fields is performed to form the ferromagnetic layer 25 of the stack 20 and the magnetic domain controlling ferromagnetic films 31a and 31b of the heat-treatment type antiferromagnetic material, for example. Take, as a specific example, the case where a blocking temperature (the temperature at which the exchange coupling can occur on the interface) of the antiferromagnetic layer 26 and the ferromagnetic layer 25 is higher than the blocking temperature of the magnetic domain controlling antiferromagnetic films 32a and 32b and the magnetic domain controlling ferromagnetic films 31a and 31b. In this case, the thin film magnetic head 100 is heated to the blocking temperature of the antiferromagnetic layer 26 and the ferromagnetic layer 25 with the magnetic field applied in the y-direction, for example, by utilizing a magnetic field generating apparatus or the like. Thus, the orientation of the magnetization of the ferromagnetic layer 25 is fixed in the direction of the applied magnetic field, i.e., the y-direction by the exchange coupling between the ferromagnetic layer 25 and the antiferromagnetic layer 26. Then, the thin film magnetic head 100 is cooled to the blocking temperature of the magnetic domain controlling antiferromagnetic films 32a and 32b and the magnetic domain controlling ferromagnetic films 31a and 31b, whereby the magnetic field is applied in the x-direction, for instance. Thus, the orientations of the magnetizations of the magnetic domain controlling ferromagnetic films 31a and 31b are fixed in the direction of the applied magnetic field, i.e., the x-direction by the exchange coupling between the magnetic domain controlling ferromagnetic films 31a and 31b and the magnetic domain controlling antiferromagnetic films 32a and 32b.

When the blocking temperature of the antiferromagnetic layer 26 and the ferromagnetic layer 25 is lower than the blocking temperature of the magnetic domain controlling antiferromagnetic films 32a and 32b and the magnetic domain controlling ferromagnetic films 31a and 31b, the process is the reverse of the above procedure. The heat treatment is not necessary for forming the antiferromagnetic layer 26 or the magnetic domain controlling antiferromagnetic films 32a and 32b of the non-heat-treatment type antiferromagnetic material. Herein, the heat treatment for the antiferromagnetizing takes place after the formation of the overcoat layer 48. However, after the deposition of the ferromagnetic layer 25 and the antiferromagnetic layer 26, the heat treatment may take place prior to the formation of the overcoat layer 48. Alternatively, after the deposition of the magnetic domain control films 30a and 30b, the heat treatment may take place prior to the formation of the overcoat layer 48. A combination of the antiferromagnetic materials of the antiferromagnetic layer 26 and the magnetic domain controlling antiferromagnetic films 32a and 32b may be the combination of the heat-treatment type antiferromagnetic materials or the combination of the non-heat-treatment type antiferromagnetic materials.

Finally, the air bearing surface is formed by machining the slider, for example, whereby the thin film magnetic head 100 shown in FIGS. 3 to 7 is completed.

<Effect of First Embodiment>

According to this embodiment, the soft magnetic layer includes the soft magnetic interlayer 28 having the magnetism and the electrical resistance higher than the electrical resistance of the soft magnetic layer. Thus, the path for the electrons e can be narrowed and therefore the rate of resistance change of the stack 20 can be increased. Accordingly, even a low signal magnetic field can be detected. Moreover, the orientations of the magnetizations Mf of the second soft magnetic layer 23, the first upper layer 22b and the first lower layer 22a can be integrally changed, and thus the coercive force Hc can be reduced. Therefore, a small variation in output and a high precision of repeatability can be obtained. The above advantages permit magnetic recording at high density exceeding 20 gigabits per square inch, for example. Moreover, thermal stability is high. Thus, even if a manufacturing process includes the step of heat treatment, less deterioration in properties is caused and therefore the high rate of resistance change can be obtained.

More particularly, in this embodiment, the soft magnetic interlayer 28 is included in the first soft magnetic layer 22, and thus the coercive force Hc can be further reduced.

Moreover, a ratio $D_1/T_n$ of the distance $D_1$ between the nonmagnetic layer 24 and the soft magnetic interlayer 28 to the thickness $T_n$ of the soft magnetic layer is 0.3 or more and less than 1. Also, the distance $D_1$ between the nonmagnetic layer 24 and the soft magnetic interlayer 28 is 1 nm or more and less than 8 nm. Thus, the range of movement of the electrons is not excessively narrowed but can be effectively limited, and therefore the higher rate of resistance change can be obtained.

Furthermore, the soft magnetic interlayer 28 contains at least one of oxide, nitride and nitride oxide, whereby the soft magnetic interlayer 28 can be magnetically stabilized and can reduce the variation in output. Therefore, stable properties can be obtained.

Additionally, the thickness of the soft magnetic interlayer 28 is from 0.5 nm to 1.0 nm inclusive, whereby the route for the electrons can be effectively limited. Therefore, the higher rate of resistance change can be obtained and the coercive force Hc can be further reduced.

Furthermore, the soft magnetic interlayer 28 is formed by partly oxidizing, nitriding or oxidizing and nitriding the soft magnetic layer, whereby the good soft magnetic interlayer 28 can be easily obtained. That is, the MR element and the thin film magnetic head according to this embodiment can be easily manufactured.

[Modification of First Embodiment]

A modification of the first embodiment will be described with reference to FIGS. 15 and 16.

Figure 15:
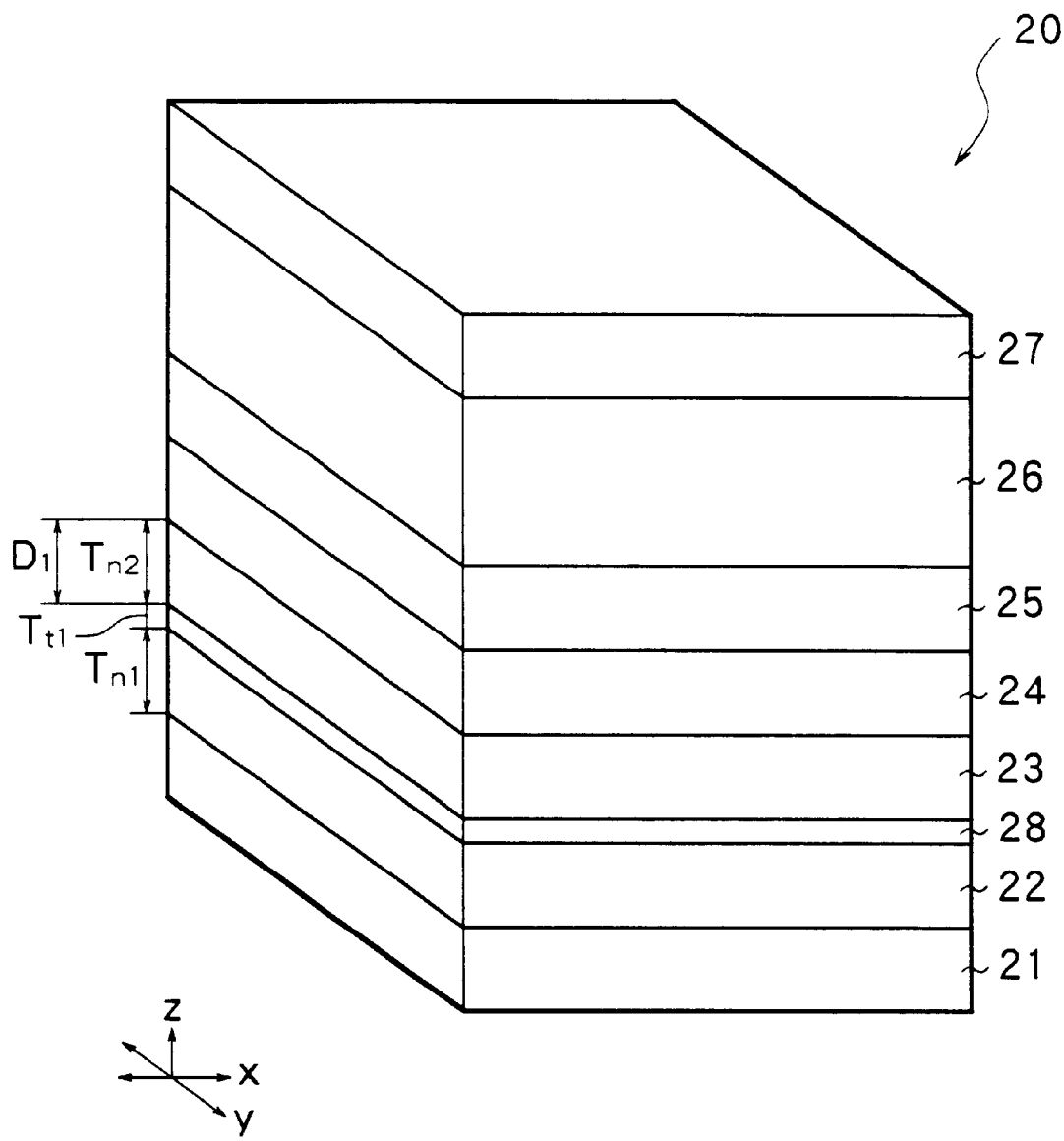
FIG. 15 is a perspective view of a modification of the stack of the MR element according to the first embodiment.

FIG. 15 shows the structure of the stack 20 of the modification. In the first embodiment, the soft magnetic interlayer 28 of the stack 20 is formed in the first soft magnetic layer 22. However, like this modification, the soft magnetic interlayer 28 may be sandwiched between the first soft magnetic layer 22 and the second soft magnetic layer 23. In this case, for example, the soft magnetic interlayer 28 is made of the material having the higher electrical resistance than the materials making the first soft magnetic layer 22 and the second soft magnetic layer 23, whereby the soft magnetic interlayer 28 has the higher electrical resistance than the first soft magnetic layer 22 and the second soft magnetic layer 23. In this modification, the thickness $T_n$ of the soft magnetic layer is equal to a thickness $T_{n1}$ of the first soft magnetic layer 22 plus the thickness $T_{n2}$ of the second soft magnetic layer 23. The distance $D_1$ between the nonmagnetic layer 24 and the soft magnetic interlayer 28 is equal to the thickness $T_{n2}$ of the second soft magnetic layer 23.

Moreover, the soft magnetic interlayer 28 may have some common elements with the first soft magnetic layer 22 similarly to the first embodiment, for example, but the soft magnetic interlayer 28 may have some common elements with the second soft magnetic layer 23. That is, although the soft magnetic interlayer 28 may contain at least Ni in the group consisting of Ni, Co, Fe, Ta, Cr, Rh, Mo and Nb and at least one kind of element in the group consisting of O and N, the soft magnetic interlayer 28 may contain at least Co in the group consisting of Co and Fe and at least one kind of element in the group consisting of O and N. For example, the second soft magnetic layer 23 is partly oxidized, nitrided or oxidized and nitrided, whereby the good soft magnetic interlayer 28 can be easily obtained.

According to this modification, the coercive force is slightly increased, and the rate of resistance change can be further increased, compared to the first embodiment.

Figure 16:
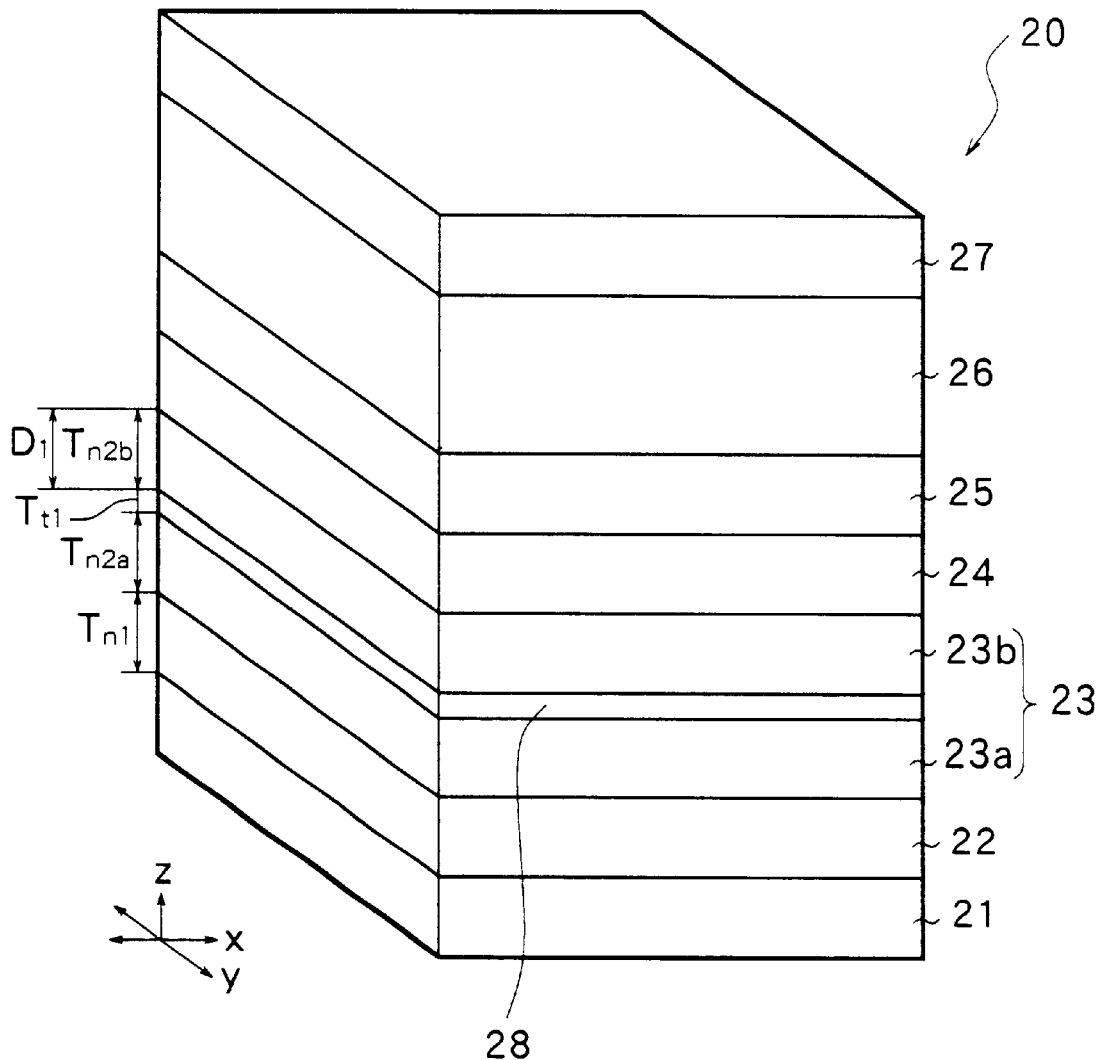
FIG. 16 is a perspective view of another modification of the stack of the MR element according to the first embodiment.

FIG. 16 shows the structure of the stack 20 of another modification. Like this modification, the soft magnetic interlayer 28 may be formed in the second soft magnetic layer 23. That is, the second soft magnetic layer 23 is divided into a second lower layer 23a and a second upper layer 23b in the direction of stack, whereby the soft magnetic interlayer 28 may be sandwiched between the second lower layer 23a and the second upper layer 23b. In this case, for example, the soft magnetic interlayer 28 is made of the material having the higher electrical resistance than the material making the second soft magnetic layer 23, whereby the soft magnetic interlayer 28 has the higher electrical resistance than the second soft magnetic layer 23. In this modification, the thickness $T_n$ of the soft magnetic layer is equal to the thickness $T_{n1}$ of the first soft magnetic layer 22 plus a thickness $T_{n2a}$ of the second lower layer 23a plus a thickness $T_{n2b}$ of the second upper layer 23b. The distance $D_1$ between the nonmagnetic layer 24 and the soft magnetic interlayer 28 is equal to the thickness $T_{n2b}$ of the second upper layer 23b. Preferably, the soft magnetic interlayer 28 has some common elements with the second soft magnetic layer 23, for example. That is, preferably, the soft magnetic interlayer 28 contains at least Co in the group consisting of Co and Fe and at least one kind of element in the group consisting of O and N. For example, the second soft magnetic layer 23 is partly oxidized, nitrided or oxidized and nitrided, whereby the good soft magnetic interlayer 28 can be easily obtained.

According to this modification, the coercive force is increased, and the rate of resistance change can be further increased, compared to the first embodiment and the foregoing modification.

[Second Embodiment]

Furthermore, a second embodiment of the invention will be described with reference to the drawing. This embodiment has the same structure as the first embodiment except that a stack 50 has a different structure. Accordingly, the same elements are indicated by the same reference numerals and the detailed description thereof is omitted.

Figure 17:
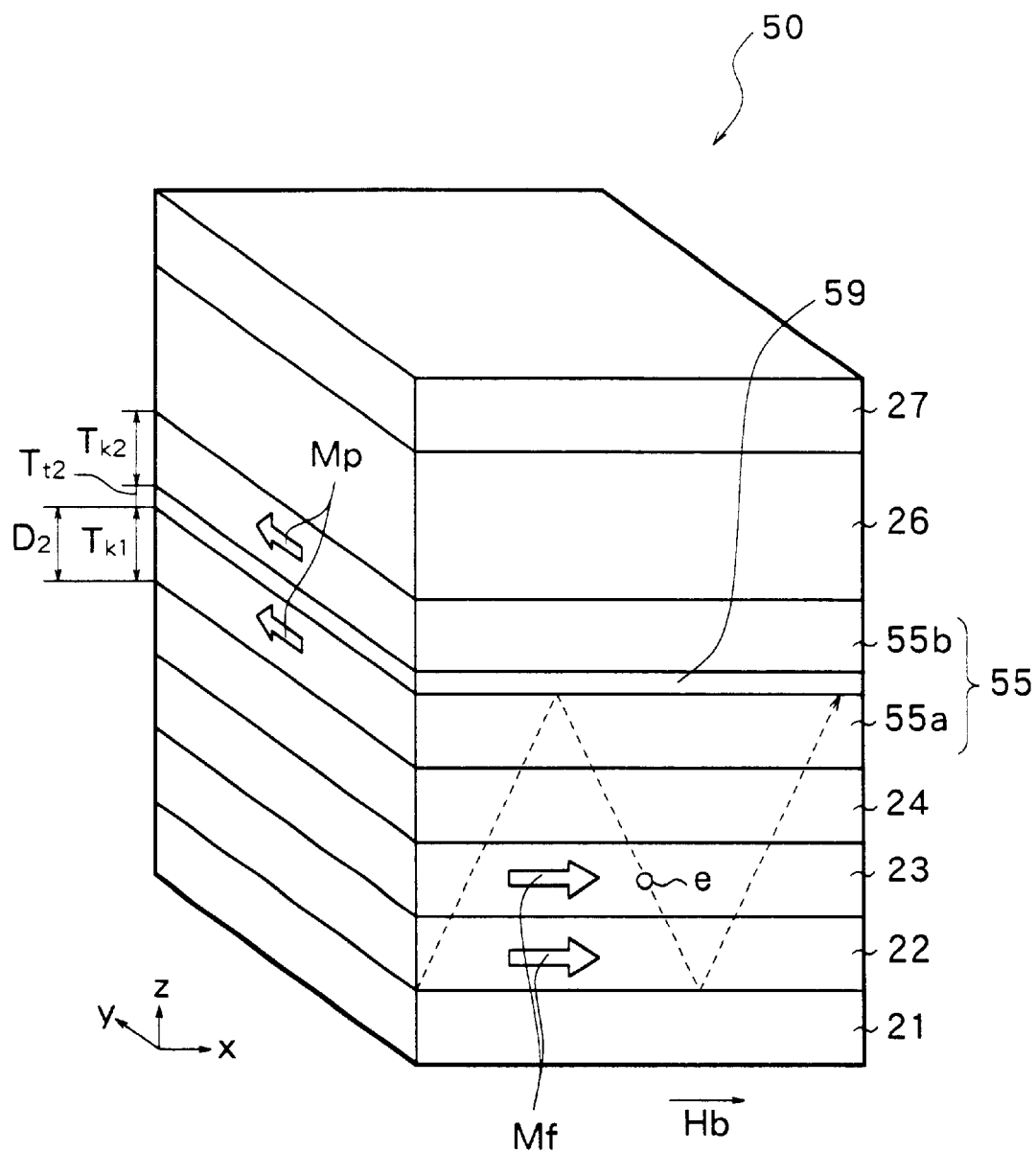
FIG. 17 is a perspective view of the structure of the stack of the MR element according to a second embodiment of the invention.

FIG. 17 shows the structure of the stack 50 of this embodiment. The stack 50 has the same structure as the stack 20 of the first embodiment, except that a ferromagnetic layer 55 includes a ferromagnetic interlayer 59 instead of the soft magnetic interlayer 28 of the first embodiment and the first soft magnetic layer 22 is not divided. The ferromagnetic layer 55 is divided into a lower ferromagnetic layer 55a and an upper ferromagnetic layer 55b in the direction of stack, and the ferromagnetic interlayer 59 is sandwiched between the lower ferromagnetic layer 55a and the upper ferromagnetic layer 55b. The ferromagnetic layer 55 is separated by the ferromagnetic interlayer 59, but the orientations of the magnetizations Mp of the lower ferromagnetic layer 55a and the upper ferromagnetic layer 55b are fixed in the same direction as the direction of the first embodiment by the antiferromagnetic layer 26 because the ferromagnetic interlayer 59 has the magnetism as described below. The orientation of the magnetization of the ferromagnetic interlayer 59 is also fixed in the same direction as the orientation of the magnetization Mp of the ferromagnetic layer 55 by the antiferromagnetic layer 26.

When the sense current flows through the stack 50, the ferromagnetic interlayer 59 reflects at least some electrons e and thus limits the route for the electrons e, thereby increasing the rate of resistance change of the stack 50, similarly to the soft magnetic interlayer 28 of the first embodiment. The ferromagnetic interlayer 59 has the magnetism and the electrical resistance higher than the electrical resistance of the ferromagnetic layer 55. For example, similarly to the soft magnetic interlayer 28 of the first embodiment, the ferromagnetic interlayer 59 is made of the material whose electrical resistance is higher than that of the material making the ferromagnetic layer 55. For example, preferably, the ferromagnetic interlayer 59 contains at least one of oxide, nitride and nitride oxide. Preferably, the ferromagnetic interlayer 59 has some common elements with the ferromagnetic layer 55. Specifically, it is preferable that the ferromagnetic interlayer 59 contains at least Co in the group consisting of Co and Fe and at least one kind of element in the group consisting of O and N. For example, the ferromagnetic layer 55 is partly oxidized, nitrided or oxidized and nitrided, whereby the good ferromagnetic interlayer 59 can be easily obtained.

Preferably, a thickness $T_{f2}$ of the ferromagnetic interlayer 59 is from 0.5 nm to 1.0 nm inclusive similarly to the soft magnetic interlayer 28 of the first embodiment, for example. Too thick a ferromagnetic interlayer 59 cannot obtain a sufficient value of the exchange coupling magnetic field between the ferromagnetic layer 55 and the antiferromagnetic layer 26. Too thin a ferromagnetic interlayer 59 cannot sufficiently limit the route for the electrons and cannot thus obtain the high rate of resistance change. Preferably, the ferromagnetic interlayer 59 is positioned so that a distance $D_2$ between the ferromagnetic interlayer 59 and the nonmagnetic layer 24 may be within a range of $0.2T_k \leq D_2 \leq 0.8T_k$, where $T_k$ represents the thickness of the ferromagnetic layer 55. In this embodiment, the thickness $T_k$ of the ferromagnetic layer 55 is equal to a thickness $T_{ka}$ of the lower ferromagnetic layer 55a plus a thickness $T_{kb}$ of the upper ferromagnetic layer 55b. The distance $D_2$ between the ferromagnetic interlayer 59 and the nonmagnetic layer 24 is equal to the thickness $T_{ka}$ of the lower ferromagnetic layer 55a. Preferably, the distance $D_2$ between the ferromagnetic interlayer 59 and the nonmagnetic layer 24 is within a range of from 0.6 nm to 3.6 nm inclusive expressed in a specific numerical value. Within this range, the range of movement of the electrons e is not excessively narrowed but can be effectively limited. Therefore, a sufficient exchange coupling magnetic field Hex can be obtained as well as the high rate of resistance change.

The stack 50 can be manufactured in the same manner as the first embodiment. In manufacturing, for example, the ferromagnetic interlayer 59 is deposited in the same manner as the soft magnetic interlayer 28 of the first embodiment. That is, after the lower ferromagnetic layer 55a is deposited, at least one of oxygen gas and nitrogen gas is introduced into the vacuum chamber not shown. Then, the surface of the lower ferromagnetic layer 55a is exposed to the atmosphere containing at least one of oxygen and nitrogen. Thus, the surface of the lower ferromagnetic layer 55a is oxidized, nitrided or oxidized and nitrided, whereby the ferromagnetic interlayer 59 is deposited.

In this embodiment, the information recorded on the magnetic recording medium 300 is readout in the same manner as the first embodiment. However, in this embodiment, the ferromagnetic layer 55 includes the ferromagnetic interlayer 59 having the higher electrical resistance than the ferromagnetic layer 55. Thus, when the sense current flows through the stack 50, the surface of the ferromagnetic interlayer 59 reflects at least some of the electrons e moving from the ferromagnetic layer 55 toward the ferromagnetic interlayer 59. Thus, the path for the electrons e is narrowed, and therefore the rate of resistance change of the stack 50 is increased similarly to the first embodiment.

According to this embodiment, the ferromagnetic interlayer 59 is positioned so that a ratio $D_2/T_k$ of the distance $D_2$ between the ferromagnetic interlayer 59 and the nonmagnetic layer 24 to the thickness $T_k$ of the ferromagnetic layer 55 may be from 0.2 to 0.8 inclusive, or the ferromagnetic interlayer 59 is positioned so that the distance $D_2$ between the ferromagnetic interlayer 59 and the nonmagnetic layer 24 may be from 0.6 nm to 3.6 nm inclusive. Thus, the rate of resistance change of the stack 50 can be increased, and the exchange coupling magnetic field between the antiferromagnetic layer 26 and the ferromagnetic layer 55 can be sufficiently increased. Moreover, the thermal stability is high. Thus, even if the manufacturing process includes the step of heat treatment, the high rate of resistance change can be obtained.

Moreover, the ferromagnetic interlayer 59 contains at least one of oxide, nitride and nitride oxide, whereby the variation in output can be reduced and thus the stable properties can be obtained similarly to the first embodiment.

Furthermore, the thickness of the ferromagnetic interlayer 59 is from 0.5 nm to 1.0 nm inclusive, whereby the higher rate of resistance change can be obtained similarly to the first embodiment, and the exchange coupling magnetic field between the antiferromagnetic layer 26 and the ferromagnetic layer 55 can be sufficiently increased.

Additionally, the ferromagnetic interlayer 59 is formed by partly oxidizing, nitriding or oxidizing and nitriding the ferromagnetic layer 55, whereby the good ferromagnetic interlayer 59 can be easily obtained similarly to the first embodiment.

[Third Embodiment]

In addition, a third embodiment of the invention will be described with reference to the drawing. This embodiment has the same structure as the first embodiment except that a stack 60 has a different structure. Accordingly, the same elements are indicated by the same reference numerals and the detailed description thereof is omitted.

Figure 18:
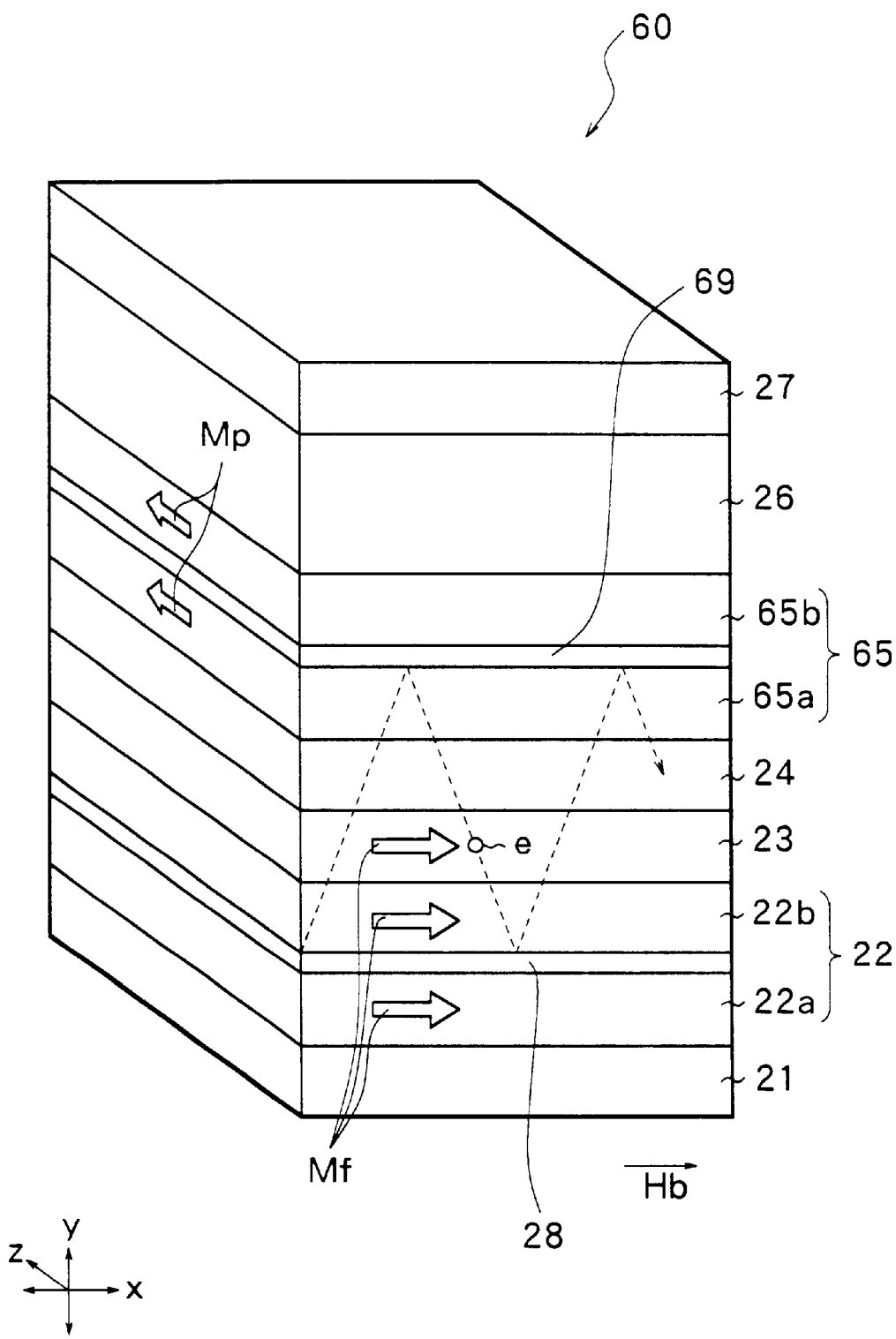
FIG. 18 is a perspective view of the structure of the stack of the MR element according to a third embodiment of the invention.
Figure 19:
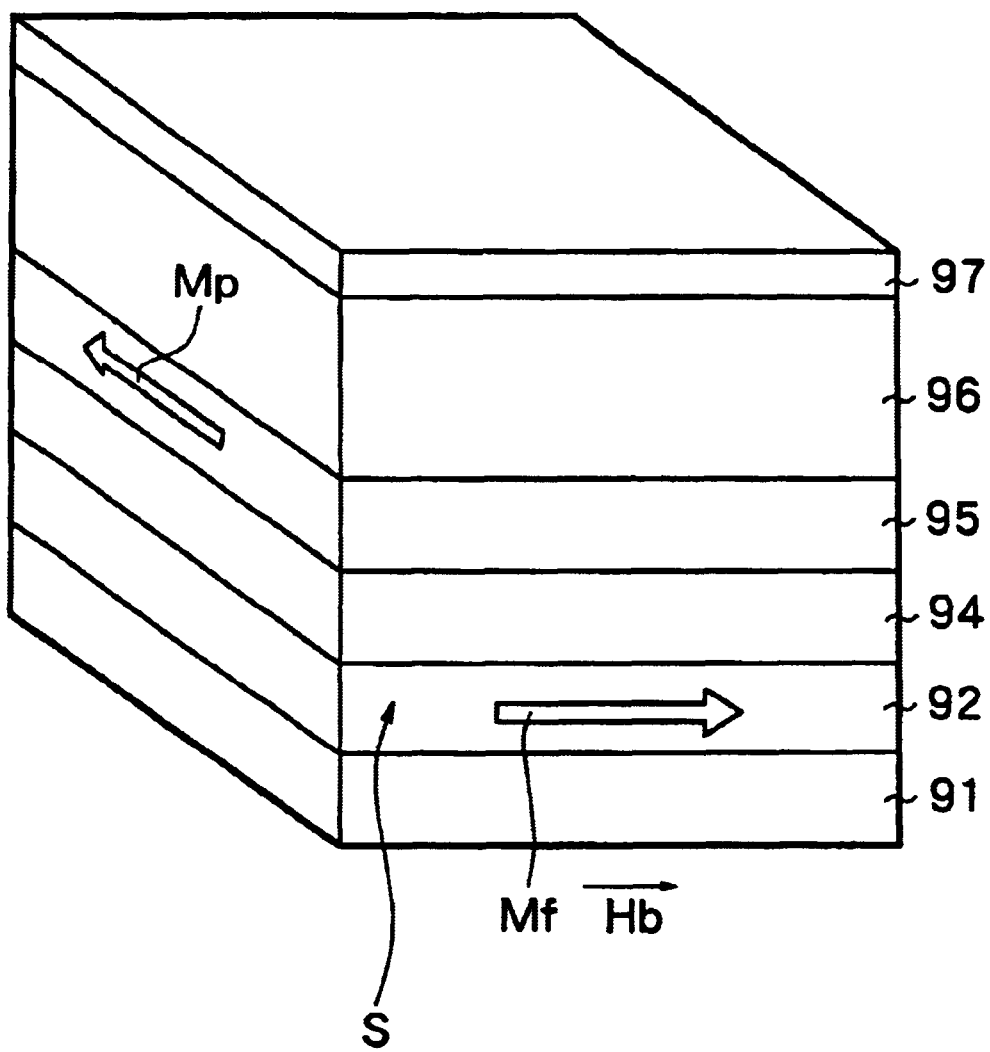
FIG. 19 is a perspective view of the structure of a spin valve film of a conventional MR element.

FIG. 18 shows the structure of the stack 60 of this embodiment. The stack 60 has the same structure as the stack 20 of the first embodiment except that a ferromagnetic layer 65 further includes a ferromagnetic interlayer 69. The ferromagnetic layer 65 and the ferromagnetic interlayer 69 have the same structure as the ferromagnetic layer 55 and the ferromagnetic interlayer 59 of the second embodiment. That is, in this embodiment, when the sense current flows through the stack 60, the route for the electrons e is narrowed by the soft magnetic interlayer 28 and the ferromagnetic interlayer 69, whereby the rate of resistance change of the stack 60 is increased.

According to this embodiment, the soft magnetic interlayer 28 is formed in the soft magnetic layer and the ferromagnetic interlayer 69 is formed in the ferromagnetic layer 65. Thus, the still higher rate of resistance change can be obtained compared to the rate of resistance change of the first and second embodiments.

Moreover, specific examples of the invention will be described in detail.

EXAMPLES 1 TO 10

The stacks 20 were prepared as examples 1 to 10. As shown in FIG. 7, each stack 20 has the stacked structure comprising the underlying layer 21, the first lower layer 22a, the soft magnetic interlayer 28, the first upper layer 22b, the second soft magnetic layer 23, the nonmagnetic layer 24, the ferromagnetic layer 25, the antiferromagnetic layer 26 and the protective layer 27, these layers being stacked in sequence on an insulating substrate. First, the underlying layer 21 of 5 nm thick was deposited on the insulating substrate by using Ta by sputtering. The first lower layer 22a was deposited on the underlying layer 21 by using NiFe with varying thickness in accordance with the examples. In the deposition, the first lower layer 22a was deposited in previous consideration of the thickness to be oxidized by the following oxidation so that the thickness $T_{n1a}$ of the first lower layer 22a might take on values shown in Table 1 after the following oxidation.

TABLE 1

| | | Thickness (nm) | | | | | |
|---|---|---|---|---|---|---|---|
| | First lower layer $T_{n1a}$ | Soft magnetic interlayer $T_{t1}$ | First upper layer $T_{n1b}$ | Soft magnetic layer $T_n$ | Distance $D_1$ between soft magnetic interlayer and nonmagnetic layer | $D_1/T_n$ | Anti-ferromagnetic layer |
| Example 1 | 4 | 0.6 | 1 | 6 | 2 | 0.33 | RuRhMn |
| 2 | 3 | 0.6 | 2 | 6 | 3 | 0.50 | RuRhMn |
| 3 | 2 | 0.6 | 3 | 6 | 4 | 0.67 | RuRhMn |
| 4 | 1 | 0.6 | 4 | 6 | 5 | 0.83 | RuRhMn |
| 5 | 2.5 | 0.6 | 0.5 | 4 | 1.5 | 0.38 | RuRhMn |
| 6 | 2 | 0.6 | 1 | 4 | 2 | 0.50 | RuRhMn |
| 7 | 3 | 0.6 | 2 | 6 | 3 | 0.50 | RuIrMn |
| 8 | 2 | 0.6 | 3 | 6 | 4 | 0.67 | RuIrMn |
| 9 | 3 | 0.6 | 2 | 6 | 3 | 0.50 | PtMn |
| 10 | 2 | 0.6 | 3 | 6 | 4 | 0.67 | PtMn |
| 11 | 2 | 0.4 | 3 | 6 | 4 | 0.67 | PtMn |
| 12 | 2 | 0.5 | 3 | 6 | 4 | 0.67 | PtMn |
| 13 | 2 | 0.9 | 3 | 6 | 4 | 0.67 | PtMn |
| 14 | 2 | 1.1 | 3 | 6 | 4 | 0.67 | PtMn |
| Comparison 1 | 0 | 0 | 5 | 6 | — | — | RuRhMn |
| 2 | 0 | 0.6 | 5 | 6 | 6 | 1.00 | RuRhMn |

Then, the surface of the first lower layer 22a was oxidized, whereby the soft magnetic interlayer 28 having the thickness $T_{t1}$ of 0.6 nm was formed. Then, the first upper layer 22b was deposited on the soft magnetic interlayer 28 with the thickness $T_{n1b}$ varied as shown in Table 1 by using NiFe by sputtering. Then, the second soft magnetic layer 23 having the thickness $T_{n2}$ of 1 nm was deposited on the first upper layer 22b by using CoFe by sputtering. The nonmagnetic layer 24 of 2.2 nm thick was deposited on the second soft magnetic layer 23 by using Cu. The ferromagnetic layer 25 of 2 nm thick was deposited on the nonmagnetic layer 24 by using CoFe. The antiferromagnetic layer 26 of 13 nm thick was deposited on the ferromagnetic layer 25 with varying materials as shown in Table 1. The protective layer 27 of 5 nm thick was deposited on the antiferromagnetic layer 26 by using Ta. In the examples 1 to 8, since the non-heat-treatment type antiferromagnetic material was used to form the antiferromagnetic layer 26, the antiferromagnetic layer 26 was deposited with the magnetic field applied. In the examples 9 and 10, since the heat-treatment type antiferromagnetic material was used to form the antiferromagnetic layer 26, the antiferromagnetic layer 26 underwent the process of antiferromagnetizing with the heat treatment after the deposition.

In each of the prepared stacks 20, the thickness $T_n$ of the soft magnetic layer, the distance D, between the soft magnetic interlayer 28 and the nonmagnetic layer 24 and the ratio $D_1/T_n$ of the distance $D_1$ between the soft magnetic interlayer 28 and the nonmagnetic layer 24 to the thickness $T_n$ of the soft magnetic layer are shown in Table 1. In the examples 1 to 4 and 7 to 10, the thickness $T_{n1}$ of the first soft magnetic layer 22 was 5 nm and the position of the soft magnetic interlayer 28 was changed in the first soft magnetic layer 22 of 5 nm thick. In the examples 5 and 6, the thickness $T_{n1}$ of the first soft magnetic layer 22 was reduced to 3 nm and the position of the soft magnetic interlayer 28 was changed in the first soft magnetic layer 22 of 3 nm thick.

The stacks 20 thus prepared underwent the heat treatment at 250° C. Then, the magnetic field was applied to the stacks 20 while the current was fed through the stacks 20. At this time, the properties of the stacks 20 were examined. The results are shown in Table 2. Moreover, when the thickness $T_{t1}$ of the soft magnetic interlayer 28 was calculated from relativity of the magnetization, it was shown that the thickness $T_{t1}$ was about 0.6 nm. Furthermore, when the thickness $T_{t1}$ of the soft magnetic interlayer 28 was observed by a TEM (Transmission Electron Microscope), it was shown that the thickness $T_{t1}$ was similarly about 0.6 nm.

TABLE 2

| | | Rate of resistance change (%) | Amount of resistance change ΔR (Ω) | Resistance R of stack (Ω) | Exchange coupling magnetic field (Oe) | Coercive force (Oe) |
|---|---|---|---|---|---|---|
| Example | 1 | 8.2 | 1.4 | 17 | 540 | 0.5 |
| | 2 | 8.9 | 1.5 | 17 | 550 | 0.2 |
| | 3 | 9.5 | 1.6 | 17 | 550 | 0.2 |
| | 4 | 8.5 | 1.4 | 17 | 560 | 0.2 |
| | 5 | 9.2 | 1.7 | 18 | 540 | 0.8 |
| | 6 | 10.5 | 1.9 | 18 | 530 | 0.5 |
| | 7 | 9.0 | 1.5 | 17 | 500 | 0.6 |
| | 8 | 9.2 | 1.6 | 17 | 540 | 0.4 |
| | 9 | 9.7 | 1.6 | 17 | 720 | 0.5 |
| | 10 | 10.0 | 1.6 | 16 | 730 | 0.4 |
| | 11 | 8.0 | 1.3 | 16 | 700 | 0.2 |
| | 12 | 9.6 | 1.6 | 17 | 740 | 0.2 |
| | 13 | 9.5 | 1.6 | 17 | 750 | 0.9 |

TABLE 2-continued

|  |  | Rate of resistance change (%) | Amount of resistance change ΔR (Ω) | Resistance R of stack (Ω) | Exchange coupling magnetic field (Oe) | Coercive force (Oe) |
|---|---|---|---|---|---|---|
|  | 14 | 8.3 | 1.4 | 17 | 730 | 1.9 |
| Comparison | 1 | 6.9 | 1.0 | 15 | 550 | 0.1 |
| parison | 2 | 7.0 | 1.2 | 17 | 560 | 1.5 |

The stack was prepared as a comparison 1 to the examples under the same condition as the condition for the examples 1 to 4, except that the soft magnetic interlayer was not formed and the thickness $T_{n1}$ of the first soft magnetic layer was 5 nm. Moreover, the stack was prepared as a comparison 2 under the same condition as the condition for the examples 1 to 4, except that the soft magnetic interlayer was formed between the underlying layer and the first soft magnetic layer and the thickness $T_{n1}$ of the first soft magnetic layer was 5 nm. The properties of these comparisons 1 and 2 were examined in the same manner as the examples. The results are also shown in Table 2.

As can be seen from Table 2, according to the examples, the rate of resistance change of each of the stacks 20 was 8% or more, which could be higher than 6.9% of the comparison 1 and 7.0% of the comparison 2. Moreover, the coercive force Hc of the first soft magnetic layer 22 and the second soft magnetic layer 23 was 0.2 (Oe) to 0.8 (Oe), which could be far less than 3 (Oe) regarded as an acceptable limit of a spin valve type MR element and could be substantially equal to the value of the comparison 1 of the prior art. Furthermore, the exchange coupling magnetic field Hex was 530 (Oe) or more, which could be much higher than 200 (Oe), a minimum value generally required for the spin valve type MR element. In other words, it turned out that the soft magnetic interlayer 28 is formed in the first soft magnetic layer 22, whereby the rate of resistance change can be increased while the coercive force Hc can be reduced.

Moreover, there was shown a tendency that the highest rate of resistance change and the lowest coercive force Hc were obtained when the ratio $D_1/T_n$ of the distance $D_1$ between the soft magnetic interlayer 28 and the nonmagnetic layer 24 to the thickness $T_n$ of the soft magnetic layer was within a range of from 0.5 to 0.8. Furthermore, there was exhibited a tendency that the rate of resistance change was slightly reduced and the coercive force Hc was slightly increased when $D_1/T_n$ was too low. In other words, it turned out that the soft magnetic interlayer 28 is positioned so that $D_1/T_n$ may be 0.3 or more and less than 1, whereby the rate of resistance change can be further increased while the coercive force Hc can be further reduced.

EXAMPLES 11 TO 14

The stacks 20 were prepared as examples 11 to 14 under the same condition as the condition for the example 10, except that the thickness $T_{t1}$ of the soft magnetic interlayer 28 was changed as shown in Table 1. The properties of these stacks 20 were examined in the same manner as the example 10. The results are shown in Table 2.

As can be seen from Table 2, the following tendency was exhibited. In the example 10 in which the thickness $T_{t1}$ of the soft magnetic interlayer 28 was 0.6 nm, the highest rate of resistance change was obtained, and the rate of resistance change was reduced regardless of whether the thickness $T_{t1}$ was reduced or increased. Moreover, there was shown a tendency that the coercive force Hc was increased when the thickness $T_{t1}$ of the soft magnetic interlayer 28 was increased. That is, it turned out that the thickness $T_{t1}$ of the soft magnetic interlayer 28 is from 0.5 nm to 1 nm inclusive, whereby the rate of resistance change can be further increased while the coercive force Hc can be reduced.

EXAMPLES 15 TO 24

The stacks 20 were prepared as examples 15 to 24 under the same condition as the condition for the examples 1 to 10, except that the soft magnetic interlayer 28 was formed between the first soft magnetic layer 22 and the second soft magnetic layer 23 and the thickness $T_{n1}$ of the first soft magnetic layer 22, the thickness $T_{n2}$ of the second soft magnetic layer 23 and the material of the antiferromagnetic layer 26 were changed as shown in Table 3. In each of the prepared stacks 20, the thickness $T_n$ of the soft magnetic layer, the distance $D_1$ between the soft magnetic interlayer 28 and the nonmagnetic layer 24 and the ratio $D_1/T_n$ of the distance $D_1$ between the soft magnetic interlayer 28 and the nonmagnetic layer 24 to the thickness $T_n$ of the soft magnetic layer are shown in Table 3.

TABLE 3

|  |  | Thickness (nm) | | | | Distance $D_1$ between | | |
|---|---|---|---|---|---|---|---|---|
|  |  | First soft magnetic layer $T_{n1}$ | Soft magnetic interlayer $T_{t1}$ | Second soft magnetic layer $T_{n2}$ | Soft magnetic layer $T_n$ | soft magnetic interlayer and nonmagnetic layer | $D_1/T_n$ | Antiferromagnetic layer |
| Example | 15 | 4 | 0.6 | 2 | 6 | 2 | 0.33 | RuRhMn |
|  | 16 | 3 | 0.6 | 3 | 6 | 3 | 0.50 | RuRhMn |
|  | 17 | 2 | 0.6 | 4 | 6 | 4 | 0.67 | RuRhMn |
|  | 18 | 1 | 0.6 | 5 | 6 | 5 | 0.83 | RuRhMn |
|  | 19 | 2 | 0.6 | 3 | 5 | 3 | 0.60 | RuRhMn |
|  | 20 | 1 | 0.6 | 4 | 5 | 4 | 0.80 | RuRhMn |
|  | 21 | 4 | 0.6 | 2 | 6 | 2 | 0.33 | RuIrMn |

TABLE 3-continued

| | | First soft magnetic layer $T_{n1}$ | Soft magnetic interlayer $T_{t1}$ | Second soft magnetic layer $T_{n2}$ | Soft magnetic layer $T_n$ | Distance $D_1$ between soft magnetic interlayer and nonmagnetic layer | $D_1/T_n$ | Anti-ferromagnetic layer |
|---|---|---|---|---|---|---|---|---|
| | 22 | 3 | 0.6 | 3 | 6 | 3 | 0.50 | RuIrMn |
| | 23 | 4 | 0.6 | 2 | 6 | 2 | 0.33 | PtMn |
| | 24 | 3 | 0.6 | 3 | 6 | 3 | 0.50 | PtMn |
| | 25 | 3 | 0.4 | 3 | 6 | 3 | 0.50 | PtMn |
| | 26 | 3 | 0.5 | 3 | 6 | 3 | 0.50 | PtMn |
| | 27 | 3 | 0.9 | 3 | 6 | 3 | 0.50 | PtMn |
| | 28 | 3 | 1.1 | 3 | 6 | 3 | 0.50 | PtMn |
| Comparison | 3 | 3 | 0 | 3 | 6 | — | — | RuRhMn |

Column headers for Thickness (nm): First soft magnetic layer $T_{n1}$, Soft magnetic interlayer $T_{t1}$, Second soft magnetic layer $T_{n2}$, Soft magnetic layer $T_n$.

In the examples 15 to 18 and 21 to 24, the thickness $T_n$ of the soft magnetic layer was 6 nm, and the thickness $T_{n1}$ of the first soft magnetic layer 22 and the thickness $T_{n2}$ of the second soft magnetic layer 23 were changed so that the position of the soft magnetic interlayer 28 was changed. In the examples 19 and 20, the thickness $T_n$ of the soft magnetic layer was reduced to 5 nm, and the thickness $T_{n1}$ of the first soft magnetic layer 22 and the thickness $T_{n2}$ of the second soft magnetic layer 23 were changed so that the position of the soft magnetic interlayer 28 was changed. The properties of these stacks 20 were examined in the same manner as the examples 1 to 10. The results are shown in Table 4.

TABLE 4

| | | Rate of resistance change (%) | Amount of resistance change $\Delta R$ ($\Omega$) | Resistance R of stack ($\Omega$) | Exchange coupling magnetic field (Oe) | Coercive force (Oe) |
|---|---|---|---|---|---|---|
| Example | 15 | 9.8 | 1.7 | 17 | 540 | 1.5 |
| | 16 | 9.5 | 1.6 | 17 | 550 | 1.7 |
| | 17 | 9.0 | 1.5 | 17 | 560 | 2.0 |
| | 18 | 8.4 | 1.4 | 17 | 540 | 2.5 |
| | 19 | 10.2 | 1.7 | 17 | 560 | 2.2 |
| | 20 | 9.4 | 1.6 | 17 | 540 | 2.8 |
| | 21 | 9.6 | 1.6 | 17 | 510 | 1.6 |
| | 22 | 9.4 | 1.6 | 17 | 520 | 1.8 |
| | 23 | 10.5 | 1.7 | 16 | 710 | 0.9 |
| | 24 | 10.0 | 1.7 | 17 | 730 | 1.2 |
| | 25 | 8.2 | 1.3 | 16 | 710 | 1.0 |
| | 26 | 10.1 | 1.7 | 17 | 720 | 1.1 |
| | 27 | 8.7 | 1.5 | 17 | 740 | 1.3 |
| | 28 | 8.1 | 1.4 | 17 | 720 | 2.4 |
| Comparison | 3 | 6.9 | 1.0 | 15 | 550 | 0.2 |

The stack was prepared as a comparison 3 to the examples under the same condition as the condition for the examples 15 to 18, except that the soft magnetic interlayer was not formed and the thickness $T_{n1}$ of the first soft magnetic layer and the thickness $T_{n2}$ of the second soft magnetic layer were 3 nm. The properties of this comparison 3 were examined in the same manner as the examples. The results are also shown in Table 4.

As can be seen from Table 4, according to the examples, the rate of resistance change of each of the stacks 20 was 8.4% or more, which could be higher than 6.5% of the comparison 3. Moreover, the coercive force Hc of the first soft magnetic layer 22 and the second soft magnetic layer 23 could be less than 3 (Oe) regarded as the acceptable limit of the spin valve type MR element. Furthermore, the exchange coupling magnetic field Hex was 510 (Oe) or more, which could be much higher than 200 (Oe), the minimum value generally required for the spin valve type MR element. In other words, it turned out that the soft magnetic interlayer 28 is formed between the first soft magnetic layer 22 and the second soft magnetic layer 23, whereby the rate of resistance change can be increased while the coercive force Hc can be reduced.

Moreover, there was shown a tendency that the examples 15 to 24 can increase the rate of resistance change compared to the examples 1 to 10. However, the coercive force Hc of the examples 15 to 24 had a tendency to increase compared to the coercive force Hc of the examples 1 to 10. That is, it turned out that the soft magnetic interlayer 28 is formed between the first soft magnetic layer 22 and the second soft magnetic layer 23, whereby the rate of resistance change can be further increased although the coercive force Hc is slightly increased. It also turned out that the soft magnetic interlayer 28 is formed between the first soft magnetic layer 22, whereby the rate of resistance change can be increased while the coercive force Hc can be further reduced.

EXAMPLES 25 TO 28

The stacks 20 were prepared as examples 25 to 28 under the same condition as the condition for the example 24, except that the thickness $T_{t1}$ of the soft magnetic interlayer 28 was changed as shown in Table 3. The properties of these stacks 20 were examined in the same manner as the example 24. The results are shown in Table 4.

As can be seen from Table 4, the following tendency was exhibited. In the example 26 in which the thickness $T_{t1}$ of the soft magnetic interlayer 28 was 0.5 nm, the highest rate of resistance change was obtained, and the rate of resistance change was reduced regardless of whether the thickness $T_{t1}$ was reduced or increased. Moreover, there was shown a tendency that the coercive force Hc was increased when the thickness $T_{t1}$ of the soft magnetic interlayer 28 was increased. That is, it turned out that the thickness $T_{t1}$ of the soft magnetic interlayer 28 is from 0.5 nm to 1 nm inclusive, whereby the rate of resistance change can be further increased while the coercive force Hc can be reduced.

is positioned between the first soft magnetic layer 22 and the second soft magnetic layer 23. In the example 31, the soft magnetic interlayer 28 is positioned in the second soft magnetic layer 23. In each of the prepared stacks 20, the thickness $T_n$ of the soft magnetic layer, the distance $D_1$ between the soft magnetic interlayer 28 and the nonmagnetic layer 24 and the ratio $D_1/T_n$ of the distance $D_1$ between the soft magnetic interlayer 28 and the nonmagnetic layer 24 to the thickness $T_n$ of the soft magnetic layer are shown in Table 5. The properties of these stacks 20 were examined in the same manner as the examples 1 to 10. The results are shown in Table 6.

TABLE 5

|  |  | Position of soft magnetic interlayer | Thickness (nm) | | Distance $D_1$ between soft magnetic interlayer and nonmagnetic layer | $D_1/T_n$ |
|---|---|---|---|---|---|---|
|  |  |  | Soft magnetic interlayer $T_{t1}$ | Soft magnetic layer $T_n$ |  |  |
| Example | 29 | In first soft magnetic layer | 0.6 | 5 | 3 | 0.6 |
|  | 30 | Between first and second soft magnetic layers | 0.6 | 5 | 3 | 0.6 |
|  | 31 | In second soft magnetic layer | 0.6 | 5 | 2 | 0.4 |
| Comparison | 4 | — | 0 | 5 | 2 | — |

TABLE 6

|  |  | Rate of resistance change (%) | Amount of resistance change $\Delta R$ ($\Omega$) | Resistance R of stack ($\Omega$) | Exchange coupling magnetic field (Oe) | Coercive force (Oe) |
|---|---|---|---|---|---|---|
| Example | 29 | 9.5 | 1.6 | 17 | 550 | 0.1 |
|  | 30 | 10.2 | 1.7 | 17 | 560 | 2.2 |
|  | 31 | 11.3 | 2.0 | 18 | 540 | 8.4 |
| Comparison | 4 | 6.7 | 1.0 | 16 | 550 | 0.2 |

EXAMPLES 29 TO 31

The stack 20 was prepared as an example 29 under the same condition as the condition for the examples 1 to 10, except that the thickness $T_{n1a}$ of the first lower layer 22a was 2 nm, the thickness $T_{n1b}$ of the first upper layer 22b was 1 nm and the thickness $T_{n2}$ of the second soft magnetic layer 23 was 2 nm. Moreover, the stack 20 was prepared as an example 30 under the same condition as the condition for the examples 1 to 10, except that the soft magnetic interlayer 28 was formed between the first soft magnetic layer 22 and the second soft magnetic layer 23, the thickness $T_{n1}$ of the first soft magnetic layer 22 was 2 nm and the thickness $T_{n2}$ of the second soft magnetic layer 23 was 3 nm. Furthermore, the stack 20 was prepared as an example 31 under the same condition as the condition for the examples 1 to 10, except that the soft magnetic interlayer 28 was formed in the second soft magnetic layer 23, the thickness $T_{n1}$ of the first soft magnetic layer 22 was 2 nm, the thickness $T_{n2a}$ of the second lower layer 23a was 1 nm and the thickness $T_{n2b}$ of the second upper layer 23b was 2 nm.

That is, the examples 29 to 31 vary in the position of the soft magnetic interlayer 28. In the example 29, the soft magnetic interlayer 28 is positioned in the first soft magnetic layer 22. In the example 30, the soft magnetic interlayer 28

The stack was prepared as a comparison 4 to the examples under the same condition as the condition for the examples 29 to 31, except that the soft magnetic interlayer was not formed, the thickness $T_{n1}$ of the first soft magnetic layer was 3 nm and the thickness $T_{n2}$ of the second soft magnetic layer was 2 nm. The properties of this comparison 4 were examined in the same manner as the examples. The results are also shown in Table 6.

As can be seen from Table 6, according to the examples, the rate of resistance change of each of the stacks 20 was higher than the rate of resistance change of the comparison 4. Moreover, the example 30 could obtain the higher rate of resistance change compared to the example 29, and the example 31 could obtain the higher rate of resistance change compared to the example 30. However, the example 30 could further reduce the coercive force Hc compared to the example 31, and the example 29 could further reduce the coercive force Hc compared to the example 30. The coercive force Hc of the example 31 was as high as 8.4 (Oe). The coercive force Hc of the example 30 was 2.2 (Oe), which was lower than 3 (Oe) but was higher than 1 (Oe), the more preferable value. That is, it turned out that the soft magnetic interlayer 28 is formed between the first soft magnetic layer 22, whereby the rate of resistance change can be increased while the coercive force Hc can be further reduced.

EXAMPLES 32 TO 41

The stacks 50 were prepared as examples 32 to 41. As shown in FIG. 17, each stack 50 has the stacked structure comprising the underlying layer 21, the first soft magnetic layer 22, the second soft magnetic layer 23, the nonmagnetic layer 24, the lower ferromagnetic layer 55a, the ferromagnetic interlayer 59, the upper ferromagnetic layer 55b, the antiferromagnetic layer 26 and the protective layer 27, these layers being stacked in sequence on the insulating substrate. First, each underlying layer 21 of 5 nm thick was deposited on the insulating substrate by using Ta by sputtering. Each first soft magnetic layer 22 of 3 nm thick was deposited on the underlying layer 21 by using NiFe. Each second soft magnetic layer 23 of 2 nm thick was deposited on the first soft magnetic layer 22 by using CoFe. Each nonmagnetic layer 24 of 2.2 nm thick was deposited on the second soft magnetic layer 23 by using Cu. Each lower ferromagnetic layer 55a was deposited on the nonmagnetic layer 24 by using CoFe with varying thickness in accordance with the examples. In the deposition, the lower ferromagnetic layer 55a was deposited in previous consideration of the thickness to be oxidized by the following oxidation so that the thickness $T_{ka}$ of the lower ferromagnetic layer 55a might take on values shown in Table 7 after the following oxidation.

Then, the surface of the lower ferromagnetic layer 55a was oxidized, whereby each ferromagnetic interlayer 59 having the thickness $T_{t2}$ of 0.6 nm was deposited. Then, each upper ferromagnetic layer 55b was deposited on the ferromagnetic interlayer 59 with the thickness $T_{kb}$ varied as shown in Table 7 by using CoFe by sputtering. Each antiferromagnetic layer 26 of was deposited on the upper ferromagnetic layer 55b with varying materials as shown in Table 7. Each protective layer 27 of 5 nm thick was deposited on the antiferromagnetic layer 26 by using Ta. When the non-heat-treatment type antiferromagnetic material was used to form the antiferromagnetic layer 26, the antiferromagnetic layer 26 was deposited with the magnetic field applied. When the heat-treatment type antiferromagnetic material was used to form the antiferromagnetic layer 26, the antiferromagnetic layer 26 underwent the process of antiferromagnetizing with the heat treatment after the deposition.

In each of the prepared stacks 50, the thickness $T_k$ of the ferromagnetic layer 55, the distance $D_2$ between the ferromagnetic interlayer 59 and the nonmagnetic layer 24 and the ratio $D_{2/Tk}$ of the distance $D_2$ between the ferromagnetic interlayer 59 and the nonmagnetic layer 24 to the thickness $T_k$ of the ferromagnetic layer 55 are shown in Table 7. After the stacks 50 were prepared, the stacks 50 underwent the heat treatment at 250° C. The magnetic field was applied to the stacks 50 while the current was fed through the stacks 50. At this time, the properties of the stacks 50 were examined.

The results are shown in Table 8.

TABLE 7

| | | Thickness (nm) | | | | | |
| | | Lower ferromagnetic layer $T_{ka}$ | Ferromagnetic interlayer $T_{t2}$ | Upper ferromagnetic layer $T_{kb}$ | Ferromagnetic layer $T_k$ | Distance $D_2$ between ferromagnetic interlayer and nonmagnetic layer | $D_2/T_k$ | Antiferromagnetic layer |
|---|---|---|---|---|---|---|---|---|
| Example | 32 | 1 | 0.6 | 2 | 3 | 1 | 0.33 | RuRhMn |
| | 33 | 1.5 | 0.6 | 1.5 | 3 | 1.5 | 0.50 | RuRhMn |
| | 34 | 2 | 0.6 | 1 | 3 | 2 | 0.67 | RuRhMn |
| | 35 | 2.5 | 0.6 | 0.5 | 3 | 2.5 | 0.83 | RuRhMn |
| | 36 | 1.5 | 0.6 | 2.5 | 4 | 1.5 | 0.38 | RuRhMn |
| | 37 | 2 | 0.6 | 2 | 4 | 2 | 0.50 | RuRhMn |
| | 38 | 1.5 | 0.6 | 1.5 | 3 | 1.5 | 0.50 | RuIrMn |
| | 39 | 2 | 0.6 | 1 | 3 | 2 | 0.67 | RuIrMn |
| | 40 | 1.5 | 0.6 | 1.5 | 3 | 1.5 | 0.50 | PtMn |
| | 41 | 2 | 0.6 | 1 | 3 | 2 | 0.67 | PtMn |
| | 42 | 2 | 0.4 | 1 | 3 | 2 | 0.67 | PtMn |
| | 43 | 2 | 0.5 | 1 | 3 | 2 | 0.67 | PtMn |
| | 44 | 2 | 0.9 | 1 | 3 | 2 | 0.67 | PtMn |
| | 45 | 2 | 1.1 | 1 | 3 | 2 | 0.67 | PtMn |
| Comparison | 5 | 0 | 0 | 3 | 3 | — | — | RuRhMn |
| | 6 | 0.5 | 0.6 | 2.5 | 3 | 0.5 | 0.17 | RuRhMn |

TABLE 8

| | | Rate of resistance change (%) | Amount of resistance change ΔR (Ω) | Resistance R of stack (Ω) | Exchange coupling magnetic field (Oe) | Coercive force (Oe) |
|---|---|---|---|---|---|---|
| Example | 32 | 9.2 | 1.4 | 15 | 350 | 0.1 |
| | 33 | 11.3 | 1.7 | 15 | 350 | 0.2 |
| | 34 | 12.3 | 1.8 | 15 | 330 | 0.1 |
| | 35 | 8.1 | 1.2 | 15 | 100 | 0.1 |
| | 36 | 11.8 | 1.7 | 14 | 270 | 0.3 |
| | 37 | 12.7 | 1.8 | 14 | 280 | 0.1 |
| | 38 | 10.8 | 1.6 | 15 | 340 | 0.1 |
| | 39 | 11.2 | 1.7 | 15 | 360 | 0.2 |

TABLE 8-continued

|  |  | Rate of resistance change (%) | Amount of resistance change ΔR (Ω) | Resistance R of stack (Ω) | Exchange coupling magnetic field (Oe) | Coercive force (Oe) |
|---|---|---|---|---|---|---|
|  | 40 | 11.1 | 1.8 | 16 | 490 | 0.1 |
|  | 41 | 11.9 | 1.9 | 16 | 510 | 0.0 |
|  | 42 | 8.5 | 1.3 | 15 | 490 | 0.1 |
|  | 43 | 11.1 | 1.8 | 16 | 500 | 0.2 |
|  | 44 | 11.5 | 1.8 | 16 | 440 | 0.2 |
|  | 45 | 8.9 | 1.5 | 17 | 230 | 0.3 |
| Com-parison | 5 | 7.4 | 1.0 | 14 | 330 | 0.2 |
|  | 6 | 5.1 | 0.8 | 15 | 180 | 0.5 |

The stack was prepared as a comparison 5 to the examples under the same condition as the condition for the examples 32 to 40, except that the ferromagnetic interlayer was not formed and the thickness $T_k$ of the ferromagnetic layer was 3 nm. Moreover, the stack was prepared as a comparison 6 under the same condition as the condition for the examples 32 to 41, except that the thickness $T_{ka}$ of the lower ferromagnetic layer was 0.5 nm and the thickness $T_{kb}$ of the upper ferromagnetic layer was 2.5 nm. The properties of these comparisons were examined in the same manner as the examples. The results are also shown in Table 8.

As can be seen from Table 8, according to the examples, the rate of resistance change of each of the stacks 50 was 9.2% or more, which could be higher than 7.4% of the comparison 5 not having the ferromagnetic interlayer. Moreover, except the example 35, the exchange coupling magnetic field Hex was 270 (Oe) or more, which could be much higher than 200 (Oe), the minimum value generally required for the spin valve type MR element. Furthermore, the coercive force Hc of the first soft magnetic layer 52 and the second soft magnetic layer 23 could be far less than 3 (Oe) regarded as the acceptable limit of a typical spin valve type MR element.

On the other hand, the comparison 6 having the ferromagnetic interlayer close to the nonmagnetic layer could only obtain the low rate of resistance change and the low exchange coupling magnetic field Hex, compared to the comparison 5 not having the ferromagnetic interlayer. Moreover, compared to the comparison 5, the example 35 having the ferromagnetic interlayer close to the antiferromagnetic layer could obtain the high rate of resistance change, but the example 35 had a very low exchange coupling magnetic field Hex of 100 (Oe) and could not obtain a sufficient exchange coupling magnetic field Hex for the spin valve type MR element. That is, the ferromagnetic interlayer 59 is positioned so that the ratio $D_2/T_k$ of the distance $D_2$ between the ferromagnetic interlayer 59 and the nonmagnetic layer 24 to the thickness $T_k$ of the ferromagnetic layer 55 may be from 0.2 to 0.8 inclusive, whereby the rate of resistance change can be increased and the sufficient exchange coupling magnetic field Hex can be obtained. It therefore turned out that this positioning is preferable.

EXAMPLES 42 TO 45

The stacks 50 were prepared as examples 42 to 45 under the same condition as the condition for the example 41, except that the thickness $T_{r2}$ of the ferromagnetic interlayer 59 was changed as shown in Table 7. The properties of these stacks 50 were examined in the same manner as the example 41. The results are shown in Table 8.

As can be seen from Table 8, the following tendency was exhibited in the example 41 in which the thickness $T_{r2}$ of the ferromagnetic interlayer 59 was 0.6 nm. That is, the highest rate of resistance change was obtained, and the rate of resistance change was reduced regardless of whether the thickness $T_{r2}$ was reduced or increased. Moreover, there was shown a tendency that the exchange coupling magnetic field Hex was reduced when the thickness $T_{r2}$ of the soft magnetic interlayer 59 was increased. In other words, it turned out that the thickness $T_{r2}$ of the ferromagnetic interlayer 59 is from 0.5 nm to 1 nm inclusive, whereby the rate of resistance change can be increased and the sufficient exchange coupling magnetic field Hex can be obtained.

EXAMPLES 46 TO 54

The stacks 60 were prepared as examples 46, 49 and 52. As shown in FIG. 18, each stack 60 has the stacked structure comprising the underlying layer 21, the first lower layer 22a, the soft magnetic interlayer 28, the first upper layer 22b, the second soft magnetic layer 23, the nonmagnetic layer 24, a lower ferromagnetic layer 65a, the ferromagnetic interlayer 69, an upper ferromagnetic layer 65b, the antiferromagnetic layer 26 and the protective layer 27, these layers being stacked in sequence on the insulating substrate. First, each underlying layer 21 of 5 nm thick was deposited on the insulating substrate by using Ta by sputtering. Each first lower layer 22a was deposited on the underlying layer 21 by using NiFe so that the thickness $T_{n1a}$ might be 2 nm after the following oxidation.

Then, the surface of the first lower layer 22a was oxidized, whereby each soft magnetic interlayer 28 having the thickness $T_{t1}$ of 0.6 nm was formed. Then, each first upper layer 22b having the thickness $T_{n1b}$ of 3 nm was deposited on the soft magnetic interlayer 28 by using NiFe by sputtering. Each second soft magnetic layer 23 having the thickness $T_{n2}$ of 1 nm was deposited on the first upper layer 22b by using CoFe. Each nonmagnetic layer 24 of 2.2 nm thick was deposited on the second soft magnetic layer 23 by using Cu. Each lower ferromagnetic layer 65a was deposited on the nonmagnetic layer 24 by using CoFe so that the thickness $T_{ka}$ might be 2 nm after the following oxidation.

After that, the surface of the lower ferromagnetic layer 65a was oxidized, whereby each ferromagnetic interlayer 69 having the thickness $T_{r2}$ of 0.6 nm was formed. After the ferromagnetic interlayer 69 was formed, each upper ferromagnetic layer 65b having the thickness $T_{kb}$ of 1 nm was deposited on the ferromagnetic interlayer 69 by using CoFe by sputtering. Each antiferromagnetic layer 26 of 13 nm thick was deposited on the upper ferromagnetic layer 65b with varying materials as shown in Table 9. Each protective layer 27 of 5 nm thick was deposited on the antiferromagnetic layer 26 by using Ta. When the non-heat-treatment type antiferromagnetic material was used to form the antiferromagnetic layer 26, the antiferromagnetic layer 26 was deposited with the magnetic field applied. When the heat-treatment type antiferromagnetic material was used to form the antiferromagnetic layer 26, the antiferromagnetic layer 26 underwent the process of antiferromagnetizing with the heat treatment after the deposition.

60 was higher than that of the comparison 7, and the sufficient coercive force Hc and exchange coupling magnetic field Hex could be also obtained. Moreover, the examples 46, 49 and 52 having both of the soft magnetic interlayer 28 and the ferromagnetic interlayer 69 could obtain the higher rate of resistance change compared to the

TABLE 9

| | | Thickness (nm) | | Anti-ferromagnetic layer | Rate of resistance change (%) | Amount of resistance change ΔR (Ω) | Resistance R of stack (Ω) | Exchange coupling magnetic field (Oe) | Coercive force (Oe) |
|---|---|---|---|---|---|---|---|---|---|
| | | Soft magnetic interlayer $T_{t1}$ | Ferromagnetic interlayer $T_{t2}$ | | | | | | |
| Example | 46 | 0.6 | 0.6 | RuRhMn | 13.5 | 2.2 | 16 | 330 | 0.3 |
| | 47 | 0.6 | 0 | RuRhMn | 10.3 | 1.6 | 16 | 340 | 0.2 |
| | 48 | 0 | 0.6 | RuRhMn | 12.5 | 1.8 | 14 | 340 | 0.1 |
| | 49 | 0.6 | 0.6 | RuIrMn | 13.0 | 2.1 | 16 | 320 | 0.3 |
| | 50 | 0.6 | 0 | RuIrMn | 9.9 | 1.6 | 16 | 340 | 0.3 |
| | 51 | 0 | 0.6 | RuIrMn | 11.9 | 1.7 | 14 | 310 | 0.2 |
| | 52 | 0.6 | 0.6 | PtMn | 13.6 | 2.2 | 16 | 500 | 0.2 |
| | 53 | 0.6 | 0 | PtMn | 11.0 | 1.8 | 16 | 510 | 0.2 |
| | 54 | 0 | 0.6 | PtMn | 11.5 | 1.7 | 15 | 480 | 0.1 |
| Comparison | 7 | 0 | 0 | RuRhMn | 7.5 | 1.0 | 14 | 330 | 0.1 |

After the stacks 60 were prepared, the stacks 60 underwent the heat treatment at 250° C. for 5 hours. The magnetic field was applied to the stacks 60 while the current was fed through the stacks 60. At this time, the properties of the stacks 60 were examined. The results are shown in Table 9.

Moreover, the stacks 20 shown in FIG. 7 were prepared as examples 47, 50 and 53 under the same condition as the condition for the examples 46, 49 and 52, except that the ferromagnetic interlayer 69 was not formed. The properties of these stacks 20 were examined in the same manner. Furthermore, the stacks 50 shown in FIG. 17 were prepared as examples 48, 51 and 54 under the same condition as the condition for the examples 46, 49 and 52, except that the soft magnetic interlayer 28 was not formed. The properties of these stacks 50 were examined in the same manner. The results are also shown in Table 9.

The stack was prepared as a comparison 7 to the examples under the same condition as the condition for the examples 44 to 54, except that the soft magnetic interlayer and the ferromagnetic interlayer were not formed. The properties of this comparison were examined in the same manner as the examples. The results are also shown in Table 9.

As can be seen from Table 9, according to the examples, the rate of resistance change of each of the stacks 20, 50 and 60 was higher than that of the comparison 7, and the sufficient coercive force Hc and exchange coupling magnetic field Hex could be also obtained. Moreover, the examples 46, 49 and 52 having both of the soft magnetic interlayer 28 and the ferromagnetic interlayer 69 could obtain the higher rate of resistance change compared to the example having only either the soft magnetic interlayer 28 or the ferromagnetic interlayer 69. That is, it turned out that both of the soft magnetic interlayer 28 and the ferromagnetic interlayer 69 are provided, whereby the higher rate of resistance change can be obtained and the sufficient coercive force Hc and exchange coupling magnetic field Hex can be obtained.

Moreover, the stacks 20, 50 and 60 of the examples 52, 53 and 54 underwent the heat treatment at 250° C. for 5 hours after the preparation. After that, the stacks 20, 50 and 60 further underwent the heat treatment at 250° C. for varying periods of time, namely, 5 hours, 10 hours, 20 hours or 50 hours. At this time, the deterioration in the rate of resistance change of each stack was examined. The results are shown in Table 10. Moreover, the thermal stability of the comparison 7 was examined in the same manner. The results are also shown in Table 10.

TABLE 10

| | | Thickness (nm) | | | Heat treatment time (h) | | | | |
|---|---|---|---|---|---|---|---|---|---|
| | | Soft magnetic interlayer $T_{t1}$ | Ferro-magnetic interlayer $T_{t2}$ | | | 5 | 10 | 20 | 50 |
| Example | 52 | 0.6 | 0.6 | Rate of resistance change (%) | | 13.6 | 13.5 | 13.3 | 13.0 | 12.8 |
| | | | | Rate of deterioration (%) | | 100 | 99 | 98 | 96 | 94 |
| | 53 | 0.6 | 0 | Rate of resistance change (%) | | 11.0 | 10.9 | 10.7 | 10.5 | 10.3 |
| | | | | Rate of deterioration (%) | | 100 | 99 | 97 | 95 | 94 |
| | 54 | 0 | 0.6 | Rate of resistance change (%) | | 11.5 | 11.4 | 11.1 | 10.8 | 10.6 |
| | | | | Rate of deterioration (%) | | 100 | 99 | 97 | 94 | 92 |
| Comparison | 7 | 0 | 0 | Rate of resistance change (%) | | 7.6 | 7.5 | 7.4 | 7.2 | 7.0 |
| | | | | Rate of deterioration (%) | | 100 | 99 | 97 | 94 | 92 |

As can be seen from Table 10, according to the examples, even after heating for 50 hours, a rate of deterioration in the rate of resistance change was 92% or more, which could be equal to or more than the rate of deterioration of the comparison 7 of the prior art. That is, it turned out that at least either the soft magnetic interlayer 28 or the ferromagnetic interlayer 59 is provided, whereby the thermal stability is high and thus the high rate of resistance change can be obtained even when the manufacturing process includes the step of heat treatment.

In the above-mentioned examples, it has been described that the soft magnetic interlayer 28 and the ferromagnetic interlayers 59 and 69 contain oxide. However, the same result can be obtained also when these interlayers contain nitride or nitride oxide.

Moreover, in the aforementioned examples, the materials and thicknesses of the underlying layer 21, the first soft magnetic layers 22 and 52, the first lower layer 22a, the first upper layer 22b, the second soft magnetic layer 23, the nonmagnetic layer 24, the ferromagnetic layers 25, 55 and 65, the lower ferromagnetic layers 55a and 65a, the upper ferromagnetic layers 55b and 65b, the antiferromagnetic layer 26 and the protective layer 27 have been described by taking specific examples. However, the same result as the result of the above examples can be obtained also when these layers comprise the materials described in the above embodiments and have the thicknesses described in the above embodiments.

Furthermore, in the above-mentioned examples, it has been specifically described that excellent properties can be obtained when the ratio $D_1/T_n$ of the distance $D_1$ between the nonmagnetic layer 24 and the soft magnetic interlayer 28 to the thickness $T_n$ of the soft magnetic layer is 0.3 or more and less than 1 or when the ratio $D_2/T_k$ of the distance $D_2$ between the nonmagnetic layer 24 and the ferromagnetic interlayer 59 to the thickness $T_k$ of the ferromagnetic layer 55 is from 0.2 to 0.8 inclusive. However, the same result can be obtained also when the distance between the nonmagnetic layer 24 and the soft magnetic interlayer 28 is 1 nm or more and less than 8 nm or when the distance between the nonmagnetic layer 24 and the ferromagnetic interlayer 59 is from 0.6 nm to 3.6 nm inclusive.

Although the invention has been described above by referring to some embodiments and examples, the invention is not limited to these embodiments and examples and various modifications of the invention are possible. For example, in the above-mentioned embodiments and examples, it has been described that the first soft magnetic layer 22, the second soft magnetic layer 23, the nonmagnetic layer 24, the ferromagnetic layer 25, 55, 65 and the antiferromagnetic layer 26 are stacked in this order from below. However, these layers may be stacked in reverse order starting at the antiferromagnetic layer. That is, the invention can be broadly applied to the magnetic transducer comprising a nonmagnetic layer having a pair of facing surfaces, a soft magnetic layer formed on one surface of the nonmagnetic layer, a ferromagnetic layer formed on the other surface of the nonmagnetic layer and an antiferromagnetic layer formed on the ferromagnetic layer on the side opposite to the nonmagnetic layer.

Moreover, in the above-mentioned embodiments and examples, it has been described that the soft magnetic layer has a two-layer structure comprising the first soft magnetic layer and the second soft magnetic layer. However, the soft magnetic layer may have a single-layer structure or the stacked structure comprising three layers or more. Moreover, in the above-described embodiments, the stacked film of the ferromagnetic film and the antiferromagnetic film is used as the magnetic domain control film. However, this stacked film may be replaced with the hard magnetic material (the hard magnet).

Furthermore, in the above-mentioned embodiments, it has been described that the magnetic transducer of the invention is used in a composite thin film magnetic head. However, the magnetic transducer of the invention can be also used in the thin film magnetic head for reproducing only. Moreover, the recording head and the reproducing head may be stacked in reverse order.

In addition, the structure of the magnetic transducer of the invention may be applied to a tunnel junction type magnetoresistive effect film (TMR film).

Furthermore, the magnetic transducer of the invention can be applied to, for example, a sensor for sensing a magnetic signal (an acceleration sensor, etc.), a memory for storing the magnetic signal or the like, in addition to the thin film magnetic head described in the above-mentioned embodiments.

As described above, according to the magnetic transducer of an aspect of the invention or the thin film magnetic head of an aspect of the invention, the soft magnetic interlayer having the magnetism and the electrical resistance higher than the electrical resistance of the soft magnetic layer is formed in the soft magnetic layer. Thus, the path for the electrons can be narrowed. The following effect is therefore achieved. The rate of resistance change can be increased, and thus even the low signal magnetic field can be detected. Moreover, the orientations of the magnetizations of the soft magnetic layer can be integrally changed, and thus the coercive force of the soft magnetic layer can be reduced. That is, the variation in output is reduced, and therefore the high precision of repeatability can be obtained. The above advantages achieve the effect of permitting the magnetic recording at high density exceeding 20 gigabits per square inch, for example. Moreover, the thermal stability is high. Thus, the following effect is achieved. Even if the manufacturing process includes the step of heat treatment, less deterioration in properties occurs and therefore the high rate of resistance change can be obtained.

More particularly, $0.3T_n \leq D_1 < T_n$ holds, where $T_n$ represents the thickness of the soft magnetic layer and $D_1$ represents the distance between the nonmagnetic layer and the soft magnetic interlayer. Also, the distance between the nonmagnetic layer and the soft magnetic interlayer is 1 nm or more and less than 8 nm. Thus, the range of movement of the electrons is not excessively narrowed but can be effectively limited. Consequently, the higher rate of resistance change can be obtained.

Additionally, when the soft magnetic layer has the first soft magnetic layer and the second soft magnetic layer, the soft magnetic interlayer is formed in the first soft magnetic layer, whereby the coercive force can be further reduced.

Furthermore, the soft magnetic interlayer contains at least one of oxide, nitride and nitride oxide, whereby the soft magnetic interlayer can be magnetically stabilized and thus the variation in output can be reduced. That is, the stable properties can be obtained.

Additionally, the thickness of the soft magnetic interlayer is from 0.5 nm to 1.0 nm inclusive, whereby the route for the electrons can be effectively limited. Therefore, the higher rate of resistance change can be obtained.

In addition, the ferromagnetic interlayer having the magnetism and the electrical resistance higher than the electrical resistance of the ferromagnetic layer is formed in the ferromagnetic layer, whereby the effect that the rate of resistance change can be further increased is achieved.

Moreover, according to the magnetic transducer of another aspect of the invention or the thin film magnetic head of another aspect of the invention, $0.2T_k \leq D_2 \leq 0.8T_k$ holds, where $T_k$ represents the thickness of the ferromagnetic layer and $D_2$ represents the distance between the nonmagnetic layer and the ferromagnetic interlayer. Also, the distance between the nonmagnetic layer and the ferromagnetic interlayer is from 0.6 nm to 3.6 nm inclusive. Thus, the following effect is achieved. The rate of resistance change can be increased, and the exchange coupling magnetic field between the antiferromagnetic layer and the ferromagnetic layer can be sufficiently increased.

Moreover, the ferromagnetic interlayer contains at least one of oxide, nitride and nitride oxide, whereby the ferromagnetic interlayer can be magnetically stabilized and thus the variation in output can be reduced. That is, the stable properties can be obtained.

Additionally, the thickness of the ferromagnetic interlayer is from 0.5 nm to 1.0 nm inclusive, whereby the route for the electrons can be effectively limited and therefore the higher rate of resistance change can be obtained.

Furthermore, according to the method of manufacturing a magnetic transducer or the method of manufacturing a thin film magnetic head of another aspect of the invention, the soft magnetic interlayer is formed by partly oxidizing, nitriding or oxidizing and nitriding the soft magnetic layer. Also, the ferromagnetic interlayer is formed by partly oxidizing, nitriding or oxidizing and nitriding the ferromagnetic layer. Thus, the following effect is achieved. The good soft magnetic interlayer or ferromagnetic interlayer can be easily obtained.

Obviously many modifications and variations of the present invention are possible in the light of the above teachings. It is therefore to be understood that within the scope of the appended claims the invention may be practiced otherwise than as specifically described.

What is claimed is:

1. A magnetic transducer comprising:
    a nonmagnetic layer having a pair of facing surfaces;
    a soft magnetic layer formed on one surface of the nonmagnetic layer, the soft magnetic layer including a first soft magnetic layer and a second soft magnetic layer, the first soft magnetic layer being located away from the nonmagnetic layer and having a composition different than that of the second soft magnetic layer, the second soft magnetic layer being located between the first soft magnetic layer and the nonmagnetic layer;
    a ferromagnetic layer formed on the other surface of the nonmagnetic layer;
    an antiferromagnetic layer formed on the ferromagnetic layer on the side opposite to the nonmagnetic layer; and
    a soft magnetic interlayer formed in the soft magnetic layer, the soft magnetic interlayer having a thickness smaller than a thickness of the first soft magnetic layer and smaller than a thickness of the second soft magnetic layer and the soft magnetic interlayer having a magnetism and made of a material having electrical resistivity higher than the electrical resistivity of the materials making the first and second magnetic layers,
    wherein the first soft magnetic layer contains at least nickel in a group including nickel (Ni), cobalt (Co), iron (Fe,), tantalum (Ta), chromium (Cr), rhodium (Rh), molybdenum (Mo) and niobium (Nb); and
    the second soft magnetic layer contains at least cobalt in a group including nickel, cobalt and iron.

2. A magnetic transducer according to claim 1, wherein $0.3T_n \leq D_1 < T_n$, where $T_n$ represents a thickness of the soft magnetic layer and $D_1$ represents a distance between the nonmagnetic layer and the soft magnetic interlayer.

3. A magnetic transducer according to claim 1, wherein the distance between the nonmagnetic layer and the soft magnetic interlayer is 1 nm or more and less than 8 nm.

4. A magnetic transducer according to claim 1, wherein the soft magnetic interlayer contains at least one of oxide, nitride and nitride oxide.

5. A magnetic transducer according to claim 4, wherein the soft magnetic interlayer contains at least nickel in a group consisting of nickel, cobalt, iron, tantalum, chromium, rhodium, molybdenum and niobium and at least one kind of element in a group consisting of oxygen (O) and nitrogen (N), or the soft magnetic interlayer contains at least cobalt in a group consisting of nickel, cobalt and iron and at least one kind of element in a group consisting of oxygen and nitrogen.

6. A magnetic transducer according to claim 1, wherein the ferromagnetic layer contains at least cobalt in a group consisting of cobalt and iron.

7. A magnetic transducer according to claim 1, wherein the antiferromagnetic layer contains at least one kind of element in a group consisting of platinum (pt), ruthenium (Ru), rhodium, palladium (Pd), nickel, gold (Au), silver (Ag), copper (Cu), iridium (Ir), chromium and iron and manganese (Mn).

8. A magnetic transducer according to claim 1, wherein the nonmagnetic layer contains at least one kind of element in a group consisting of copper, gold and silver.

9. A magnetic transducer according to claim 1, wherein the thickness of the soft magnetic interlayer is from 0.5 nm to 1.0 nm inclusive.

10. A thin film magnetic head comprising:
    a magnetic transducer,
    the magnetic transducer including:
        a nonmagnetic layer having a pair of facing surfaces;
        a soft magnetic layer formed on one surface of the nonmagnetic layer, the soft magnetic layer including a first soft magnetic layer and a second soft magnetic layer, the first soft magnetic layer being located away from the nonmagnetic layer and having a composition different than that of the second soft magnetic layer, the second soft magnetic layer being located between the first soft magnetic layer and the nonmagnetic layer;
        a ferromagnetic layer formed on the other surface of the nonmagnetic layer;
        an antiferromagnetic layer formed on the ferromagnetic layer on the side opposite to the nonmagnetic layer; and
        a soft magnetic interlayer formed in the soft magnetic layer, the soft magnetic interlayer having a thickness smaller than a thickness of the first soft magnetic layer and smaller than a thickness of the second soft magnetic layer, and the soft magnetic interlayer having magnetism and made of a material having electrical resistivity higher than the electrical resistivity of the materials making the first and second magnetic layers,
        wherein the first soft magnetic layer contains at least nickel in a group including nickel (Ni), cobalt (Co), iron (Fe), tantalum (Ta), chromium (Cr), rhodium (Rh), molybdenum (Mo) and niobium (Nb); and
        the second soft magnetic layer contains at least cobalt in a group including nickel, cobalt and iron.

11. A thin film magnetic head according to claim 10, wherein $0.3T_n \leq D_1 < T_n$, where $T_n$ represents the thickness of the soft magnetic layer and $D_1$ represents the distance between the nonmagnetic layer and the soft magnetic interlayer.

12. A thin film magnetic head according to claim 10, wherein the distance between the nonmagnetic layer and the soft magnetic interlayer is 1 nm or more and less than 8 nm.

13. A magnetic transducer comprising:
a nonmagnetic layer having a pair of facing surfaces;
a soft magnetic layer formed on one surface of the nonmagnetic layer, the soft magnetic layer including a first soft magnetic layer and a second soft magnetic layer, the first soft magnetic layer being located away from the nonmagnetic layer and having a composition different than that of the second soft magnetic layer, the second soft magnetic layer being located between the first soft magnetic layer and the nonmagnetic layer;
a ferromagnetic layer formed on the other surface of the nonmagnetic layer;
an antiferromagnetic layer formed on the ferromagnetic layer on the side opposite to the nonmagnetic layer; and
a soft magnetic interlayer formed in the soft magnetic layer, the soft magnetic interlayer having a thickness smaller than a thickness of the first soft magnetic layer and smaller than a thickness of the second soft magnetic layer and the soft magnetic interlayer having a magnetism and made of a material having electrical resistivity higher than the electrical resistivity of the materials making the first and second magnetic layers,
wherein the soft magnetic interlayer is formed in the first soft magnetic layer.

14. A magnetic transducer according to claim 13, wherein $0.3T_n \leq D_1 < T_n$, where $T_n$ represents a thickness of the soft magnetic layer and $D_1$ represents a distance between the nonmagnetic layer and the soft magnetic interlayer.

15. A magnetic transducer according to claim 13, wherein the distance between the nonmagnetic layer and the soft magnetic interlayer is 1 nm or more and less than 8 nm.

16. A magnetic transducer according to claim 13, wherein the soft magnetic interlayer contains at least one of oxide, nitride and nitride oxide.

17. A magnetic transducer according to claim 16, wherein the soft magnetic interlayer contains at least nickel in a group consisting of nickel, cobalt, iron, tantalum, chromium, rhodium, molybdenum and niobium and at least one kind of element in a group consisting of oxygen (O) and nitrogen (N), or the soft magnetic interlayer contains at least cobalt in a group consisting of nickel, cobalt and iron and at least one kind of element in a group consisting of oxygen and nitrogen.

18. A magnetic transducer according to claim 13, wherein the ferromagnetic layer contains at least cobalt in a group consisting of cobalt and iron.

19. A magnetic transducer according to claim 13, wherein the antiferromagnetic layer contains at least one kind of element in a group consisting of platinum (Pt), ruthenium (Ru), rhodium, palladium (Pd), nickel, gold (Au), silver (Ag), copper (Cu), iridium (Ir), chromium and iron and manganese (Mn).

20. A magnetic transducer according to claim 13, wherein the nonmagnetic layer contains at least one kind of element in a group consisting of copper, gold and silver.

21. A magnetic transducer according to claim 13, wherein the thickness of the soft magnetic interlayer is from 0.5 nm to 1.0 nm inclusive.

22. A thin film magnetic head comprising:
a magnetic transducer,
the magnetic transducer including:
a nonmagnetic layer having a pair of facing surfaces;
a soft magnetic layer formed on one surface of the nonmagnetic layer, the soft magnetic layer including a first soft magnetic layer and a second soft magnetic layer, the first soft magnetic layer being located away from the nonmagnetic layer and having a composition different than that of the second soft magnetic layer, the second soft magnetic layer being located between the first soft magnetic layer and the nonmagnetic layer;
a ferromagnetic layer formed on the other surface of the nonmagnetic layer;
an antiferromagnetic layer formed on the ferromagnetic layer on the side opposite to the nonmagnetic layer; and
a soft magnetic interlayer formed in the soft magnetic layer, the soft magnetic interlayer having a thickness smaller than a thickness of the first soft magnetic layer and smaller than a thickness of the second soft magnetic layer and the soft magnetic interlayer having magnetism and made of a material having electrical resistivity higher than the electrical resistivity of the materials making the first and second magnetic layers,
wherein the soft magnetic interlayer is formed in the first soft magnetic layer.

23. A thin film magnetic head according to claim 22, where $0.3T_n \leq D_1 < T_n$, where $T_n$ represents the thickness of the soft magnetic layer and $D_1$ represents the distance between the nonmagnetic layer and the soft magnetic interlayer.

24. A thin film magnetic head according to claim 22, wherein the distance between the nonmagnetic layer and the soft magnetic interlayer is 1 nm or more and less than 8 nm.

* * * * *